(12) United States Patent
Burke

(10) Patent No.: US 11,565,178 B2
(45) Date of Patent: Jan. 31, 2023

(54) USER INTERFACE RENDERING AND POST PROCESSING DURING VIDEO GAME STREAMING

(71) Applicant: Electronic Arts Inc., Redwood City, CA (US)

(72) Inventor: Max Burke, Coquitlam (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/646,560

(22) Filed: Dec. 30, 2021

(65) Prior Publication Data

US 2022/0193541 A1 Jun. 23, 2022

Related U.S. Application Data

(63) Continuation of application No. 16/819,555, filed on Mar. 16, 2020, now Pat. No. 11,213,745, which is a
(Continued)

(51) Int. Cl.
*A63F 13/355* (2014.01)
*A63F 13/77* (2014.01)
(Continued)

(52) U.S. Cl.
CPC .......... *A63F 13/355* (2014.09); *A63F 13/358* (2014.09); *A63F 13/77* (2014.09);
(Continued)

(58) Field of Classification Search
CPC ...... A63F 13/355; A63F 13/358; A63F 13/77; A63F 2300/538; H04N 19/172;
(Continued)

(56) References Cited

U.S. PATENT DOCUMENTS 5,953,506 A 9/1999 Kalra et al.
6,421,058 B2 7/2002 Parikh et al.
(Continued)

OTHER PUBLICATIONS

Ito, Asynch Queue, 2012, in 7 pages.

*Primary Examiner* — William H McCulloch, Jr.
(74) *Attorney, Agent, or Firm* — Knobbe, Martens, Olson & Bear, LLP

(57) ABSTRACT

Systems and methods for conservation of bandwidth and improved user experience via enhanced streaming of video games. An example method includes receiving a request to remotely play a video game, the video game being executed by the system and streamed to a user device for presentation. The video game is executed, and rendered image frames are generated. Geometry data associated with the rendered image frames is generated, with the geometry data representing locations of geometric elements that form geometry utilized, by the video game, to generate the rendered image frames. The rendered image frames are encoded into a gameplay stream. A first stream comprising the encoded gameplay stream and a second stream comprising the geometry data are provided to the user device. The user device is configured to perform post-processing effects on the rendered image frames encoded in the gameplay stream prior to display on the user device.

20 Claims, 16 Drawing Sheets

Related U.S. Application Data continuation of application No. 15/934,812, filed on Mar. 23, 2018, now Pat. No. 10,589,171.

(51) Int. Cl.
| | | |
|---|---|---|
| *A63F 13/358* | (2014.01) | |
| *G06T 1/20* | (2006.01) | |
| *G06T 15/00* | (2011.01) | |
| *H04N 19/172* | (2014.01) | |
| *H04N 21/2343* | (2011.01) | |
| *H04N 19/436* | (2014.01) | |

(52) U.S. Cl.
CPC .............. *G06T 1/20* (2013.01); *G06T 15/005* (2013.01); *A63F 2300/538* (2013.01); *H04N 19/172* (2014.11); *H04N 19/436* (2014.11); *H04N 21/2343* (2013.01)

(58) Field of Classification Search
CPC .............. H04N 19/436; H04N 21/2343; G06T 15/005; G06T 1/20
See application file for complete search history.

(56) References Cited

U.S. PATENT DOCUMENTS

| | | | |
|---|---|---|---|
| 6,570,564 B1 | 5/2003 | Sowizral et al. | |
| 6,631,403 B1 | 10/2003 | Deutsch et al. | |
| 6,636,214 B1 | 10/2003 | Leather et al. | |
| 7,100,020 B1 | 8/2006 | Brightman et al. | |
| 7,159,217 B2 | 1/2007 | Pulsipher et al. | |
| 7,796,155 B1 | 9/2010 | Neely, III et al. | |
| 8,171,461 B1 | 5/2012 | Kilgard et al. | |
| 8,200,796 B1 | 6/2012 | Margulis | |
| 8,319,825 B1 | 11/2012 | Urbach | |
| 8,341,550 B2 | 12/2012 | de Heer | |
| 8,719,336 B2 | 5/2014 | Douceur et al. | |
| 9,094,667 B1 | 7/2015 | Hejl | |
| 9,374,552 B2 | 6/2016 | Taraki et al. | |
| 9,415,304 B2 | 8/2016 | Harp et al. | |
| 9,694,281 B2 | 7/2017 | Garden | |
| 9,700,789 B2 | 7/2017 | Cotter | |
| 9,795,879 B2 | 10/2017 | Colenbrander | |
| 10,127,082 B2 | 11/2018 | Hejl, Jr. et al. | |
| 10,179,290 B2 | 1/2019 | Benedetto | |
| 10,296,391 B2 | 5/2019 | Justice et al. | |
| 10,315,113 B2 | 6/2019 | Marr et al. | |
| 10,376,781 B2 | 8/2019 | Marr et al. | |
| 10,403,022 B1 | 9/2019 | Silva et al. | |
| 10,537,799 B1 | 1/2020 | Burke | |
| 10,589,171 B1 | 3/2020 | Burke | |
| 10,870,060 B2 | 12/2020 | Benedetto | |
| 10,896,063 B2 | 1/2021 | Hejl, Jr. et al. | |
| 10,918,938 B2 | 2/2021 | Karlsson | |
| 10,979,744 B2* | 4/2021 | McAuley | H04N 21/4424 |
| 10,987,579 B1 | 4/2021 | Borovikov et al. | |
| 11,213,745 B1 | 1/2022 | Burke | |
| 11,369,873 B2* | 6/2022 | Smullen | A63F 13/53 |
| 2006/0105841 A1 | 5/2006 | Rom et al. | |
| 2006/0159166 A1 | 7/2006 | Mohsenian | |
| 2007/0030276 A1 | 2/2007 | MacInnis et al. | |
| 2007/0143664 A1 | 6/2007 | Fang et al. | |
| 2008/0303835 A1 | 12/2008 | Swift et al. | |
| 2008/0303837 A1 | 12/2008 | Swift et al. | |
| 2009/0002379 A1 | 1/2009 | Baeza et al. | |
| 2009/0027383 A1 | 1/2009 | Bakalash et al. | |
| 2009/0119736 A1 | 5/2009 | Perlman et al. | |
| 2009/0135190 A1 | 5/2009 | Bakalash et al. | |
| 2009/0275414 A1 | 11/2009 | Lee et al. | |
| 2009/0318213 A1 | 12/2009 | Koustas et al. | |
| 2010/0063992 A1 | 3/2010 | Ma et al. | |
| 2010/0166056 A1 | 7/2010 | Perlman et al. | |
| 2010/0166064 A1 | 7/2010 | Perlman et al. | |
| 2010/0255909 A1 | 10/2010 | McNamara | |
| 2011/0126190 A1 | 5/2011 | Urbach | |
| 2012/0004040 A1 | 1/2012 | Pereira et al. | |
| 2012/0004042 A1 | 1/2012 | Perry et al. | |
| 2012/0084789 A1 | 4/2012 | Iorio | |
| 2013/0024545 A1 | 1/2013 | Sheppard | |
| 2013/0123019 A1 | 5/2013 | Sullivan et al. | |
| 2013/0203496 A1 | 8/2013 | Kruglick | |
| 2013/0337916 A1 | 12/2013 | Saretto et al. | |
| 2014/0274368 A1 | 9/2014 | Cotter | |
| 2014/0286438 A1 | 9/2014 | Apte | |
| 2015/0133216 A1 | 5/2015 | Heinz, II | |
| 2015/0221122 A1 | 8/2015 | Son et al. | |
| 2016/0171765 A1 | 6/2016 | Mehr | |
| 2016/0296840 A1 | 10/2016 | Kaewell et al. | |
| 2016/0332081 A1 | 11/2016 | Marr et al. | |
| 2017/0113135 A1 | 4/2017 | Marr et al. | |
| 2018/0284871 A1 | 10/2018 | Surti et al. | |
| 2018/0296912 A1 | 10/2018 | Hicks et al. | |
| 2019/0088015 A1 | 3/2019 | Makinen et al. | |
| 2019/0141374 A1 | 5/2019 | McAuley et al. | |
| 2019/0146844 A1 | 5/2019 | Hejl, Jr. et al. | |
| 2020/0197821 A1 | 6/2020 | Benedetto | |
| 2020/0230499 A1* | 7/2020 | Buser | A63F 13/352 |
| 2020/0306631 A1 | 10/2020 | Karlsson | |
| 2021/0236923 A1 | 8/2021 | Karlsson | |
| 2021/0248012 A1 | 8/2021 | Hejl, Jr. et al. | |
| 2021/0316212 A1 | 10/2021 | Borovikov et al. | |
| 2022/0193541 A1* | 6/2022 | Burke | A63F 13/355 |

* cited by examiner

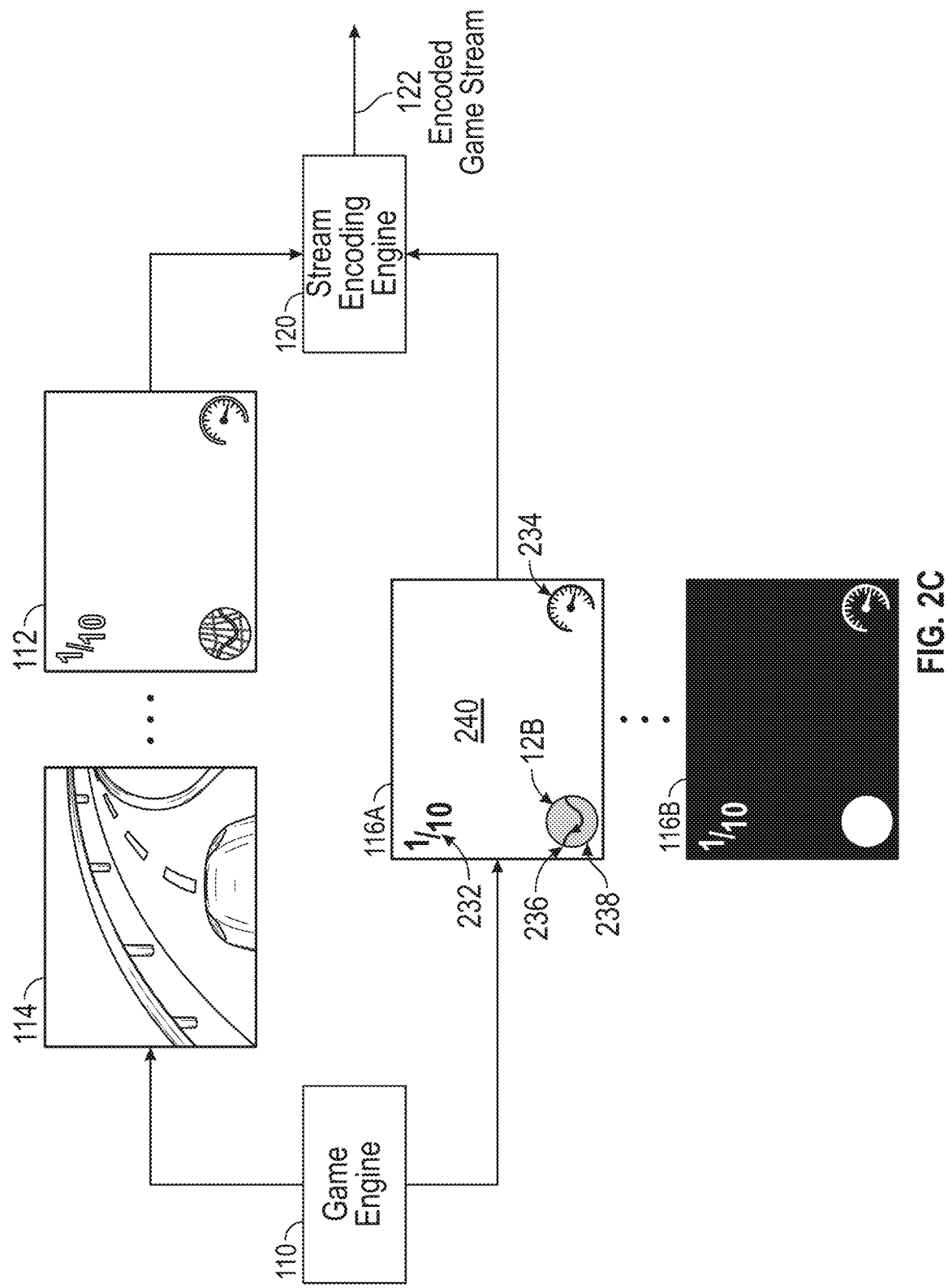

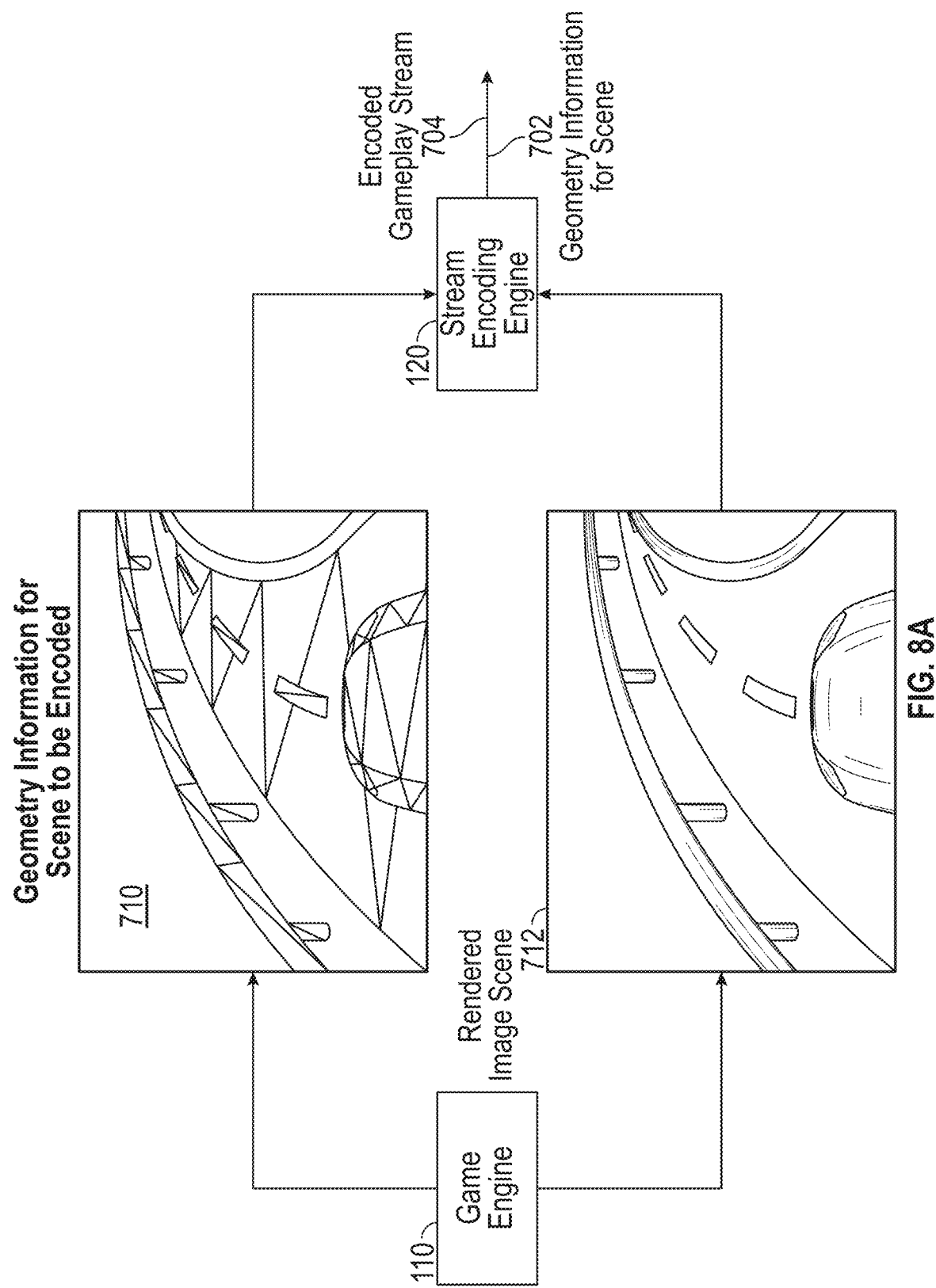

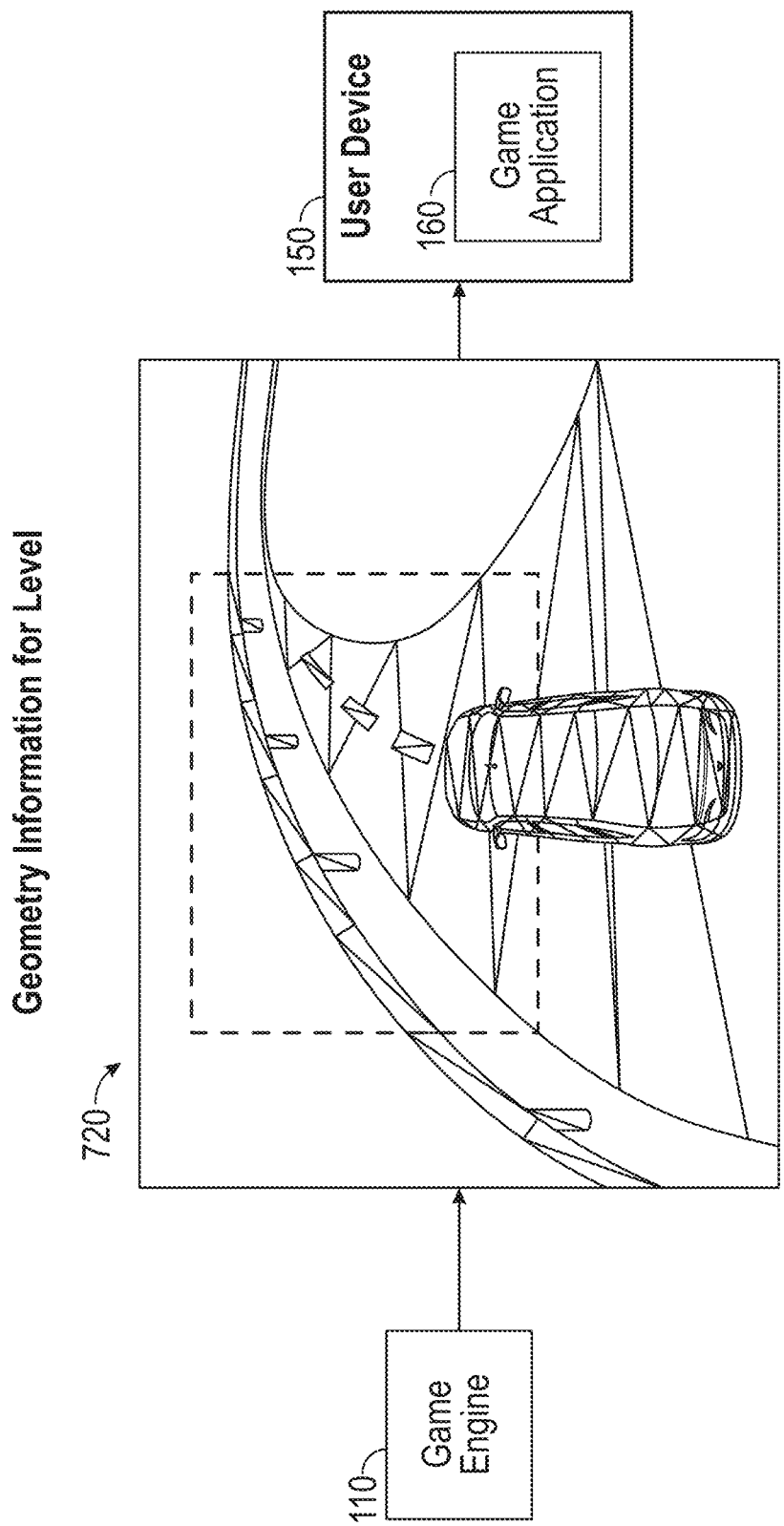

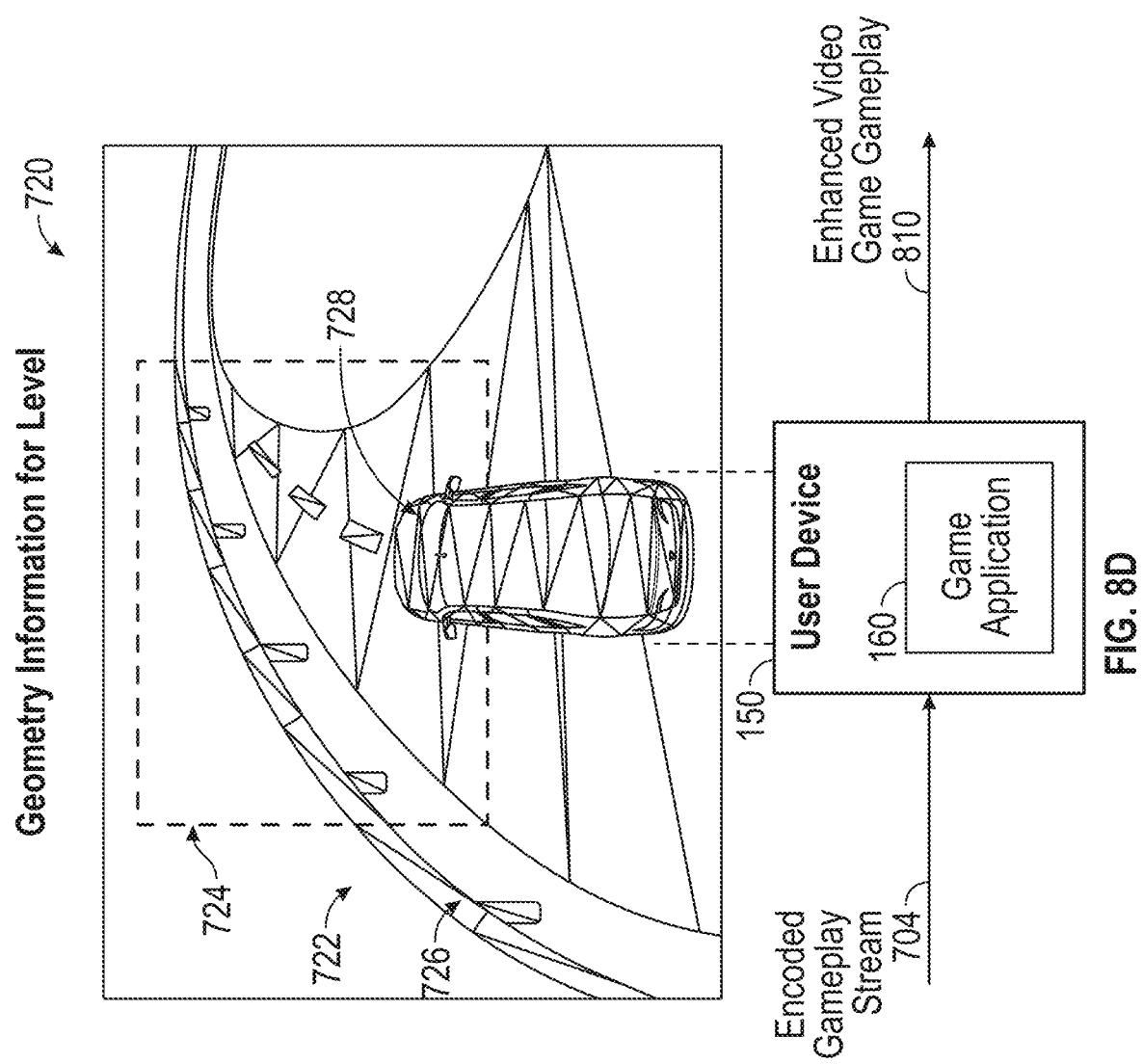

USER INTERFACE RENDERING AND POST PROCESSING DURING VIDEO GAME STREAMING

CROSS-REFERENCE TO RELATED APPLICATION

This application is a continuation of, U.S. patent application Ser. No. 16/819,555 titled "USER INTERFACE RENDERING AND POST PROCESSING DURING VIDEO GAME STREAMING" and filed on Mar. 16, 2020, which claims priority to, and is a continuation of, U.S. patent application Ser. No. 15/934,812 titled "USER INTERFACE RENDERING AND POST PROCESSING DURING VIDEO GAME STREAMING" and filed on Mar. 23, 2018, the disclosure of which is hereby incorporated herein by reference in its entirety.

FIELD OF THE DISCLOSURE

The described technology generally relates to computer technology and, more specifically, to video games.

BACKGROUND

In general, video games may be played via dedicated hardware, such as video game consoles, that are connected to displays. Users of the video games may select a video game to be played via insert of a physical disk, or via selection of a game downloaded on the dedicated hardware. The users may then utilize user input devices, such as controllers, to play the video games. As the video games are played, the dedicated hardware can process received user input and render video game gameplay for presentation on the displays.

Additionally, certain video games may be executed on outside systems and rendered video game gameplay may be provided to personal computers as a stream. The personal computers may then present the stream on connected displays. To play these video games, a user may utilize an input device (e.g., a controller) to provide user input to a personal computer. The user input may then be provided via the personal computer to the outside system for processing. Since the outside system may be executing a local copy of the video game, the outside system can provide the user input to the local copy of the video game. Subsequently, the outside system can provide updated rendered video game gameplay to the user device.

While such video game gameplay streaming systems may exist, in general they suffer from notable defects. For example, the bandwidth requirements may be quite high. That is, the bandwidth to provide a high quality rendered stream to a user device may be higher than normal streaming high definition movie or television content. Indeed, a refresh rate may be higher on video games than movie or television content, and compression artifacts may be more evident.

SUMMARY OF THE DISCLOSURE

Described herein are systems and methods for enhancements to streaming of video games to end users. Streaming of video games, as will be described herein, may include server systems executing video games to be remotely played via user devices over the internet. These server systems may have access to high end central processing units (CPUs) and graphics processing units (GPUs) that far outclass the processing power available to end users. Thus, the end users can play modern video games without investment in such high performant CPUs and GPUs. In practice however, the playability of a streamed video game may be reduced by various constraints, such as bandwidth available to an end user. As will be described, techniques may be utilized to improve gameplay experience even with such constraints.

As described above, a server system may execute a video game to enable an end user to play the video over a network. The server system can provide rendered output generated by the video game to the end user, and respond to user input provided from the end user. Based on network speed of an internet connection available to the end user, the rendered output may be of too great a size for the end user's user device to receive in a timely fashion. For example, if the rendered output is too great then a input lag may become noticeable—thus reducing playability of the video game. For example, the end user may provide user input to move a character, and the rendered output illustrating the character moving may be received with a noticeable delay. Thus, any benefit achieved by streaming video games may be lost or reduced due to the perceived unplayability of the video game.

As a first example scheme to improve playability, a server system may compress the rendered output to reduce its size. For example, the server system may utilize a video encoder, such as an encoder implementing H.264/MPEG-4, and encode rendered output generated by the video game. As another example, the server system may reduce a frame rate associated with the rendered output. In this example, the server system may eliminate particular frames from the rendered output generated by the video game. Additionally, the server system may cause the video game to reduce a frame rate associated with generating rendered output. For example, while the server system may be capable of providing enough processing power to enable the video game to generate output at 60 frames per second, the server system may instruct the video game to generate output at 30 frames per second. Similarly, the server system may cause the video game to reduce certain effects associated with rendering output. As an example, the server system may cause the video game to eliminate anti-aliasing from its rendering pipeline. As another example, the server system may reduce texture sizes or detail, reduce lighting complexity, and so on.

The first example scheme described above may indeed reduce a size associated with a stream being provided to a user device. Thus, the user device may be able to more quickly obtain (e.g., download) portions of the stream, and reduce an input lag perceived by an end user. However, the visual fidelity of the stream will also be reduced. That is, the end user may more easily ascertain visual artifacts associated with compression. This may reduce the user experience, and for example make the stream appear more like a lower quality television or movie stream.

Furthermore, the first example scheme may make certain visual elements included in the stream difficult to view. Example visual elements may include text presented on the screen, user interface elements (e.g., menus), and so on. While the video game gameplay, for example the video game characters, environments, and so on, may be reduced in quality as described above, these example visual elements may be much more noticeably affected. For example, the video game gameplay may include action and other elements that can hide or reduce the appearance of compression artifacts. To encode the rendered output, as described above the server system may utilize lossy compression (e.g., H.264). Thus, compression artifacts such as fuzz, distortion, banding, and so on, may be evident.

When trying to read text, an end user may have a more difficult time if the text suffers from such compression artifacts. Additionally, user interface elements such as menus may be presented statically to the end-user for a noticeable amount of time and compression artifacts may be noticeable. For example, if an end-user provides user input to view a settings menu, the end-user may spend 5, 10, 20, seconds reviewing the settings menu. If the settings menu is not presented crisply at a high resolution, then the end-user may easily see the degradation in quality provided by the server system.

As will be described below, a server system may compress video game gameplay separately than user interface elements (e.g., text, menus, a map of the players, a radar identifying proximate players, and so on). The server system may therefore reduce a size associated with the video game gameplay, such as via down-sampling of the rendered output generated by the video game. Additionally, the server system may compress the rendered output via an encoder to limit a size of the data which is required to be provided. With respect to the user interface elements, the server system may maintain the native resolution generated by the video game. The user interface elements and video game gameplay may then optionally be packaged together as a stream and provided to a user device for presentation. Thus, an end-user of the user device can benefit from the reduction in size of the stream while also viewing user interface elements with great clarity.

Advantageously, the server system described herein may execute a video game, and utilize metadata generated by the video game during gameplay to identify portions of rendered output (e.g., image frames) that are (1) video game gameplay or (2) user interface elements. For example, when rendering an image frame, the video game may utilize specific draw calls to render portions of the image frame. Example draw calls may include rendering video game gameplay elements such as rendering of characters, of trees, of cars, or rendering user interface elements such as text, menus, or other elements. Therefore, the video game may be configured to output video game elements for each rendered image frame, and separately output user interface elements for the rendered image frame. Optionally, a video game may be modified (e.g., execute custom code, or respond to particular scripts) to identify each element included in a rendered image frame as being either video game gameplay elements or user interface elements. Optionally, a video game may output rendered image frames along with metadata describing portions of the image frame that correspond to either video game gameplay elements or user interface elements. In this way, the server system may properly encode the video game gameplay separately from the user interface elements.

As will be described in more detail below, the server system may also enable higher compression for specific portions of video game gameplay that may be occluded or otherwise masked by user interface elements. As an example, a first example user interface element may be partially transparent. In this example, the user interface element may therefore mask detail of the video game gameplay that is included behind the user interface element. As another example, a second example user interface element may be fully opaque (e.g., a solid color, for example a menu). In this example, the user interface element may therefore entirely hide the video game gameplay that is included behind the user interface element. Thus, the server system may advantageously compress video game gameplay under the first example user interface element and second example user interface element differently. For example, the server system may entirely exclude the video game gameplay under the second user interface element. Additionally, the server system may cause the encoding of the video game gameplay under the first example user interface element to be greater than for other portions of the video game gameplay not under user interface elements. Thus, the server system may further reduce a size associated with a video game stream being provided to the user device.

The systems and methods described herein therefore improve the functioning of the computer and address technological problems. Prior example systems have been prone to problems associated with input lag. For example, these prior systems may have degraded user experience if they focus on providing high quality video streams at the expense of user perceived responsiveness of a video game. Additionally, prior example systems may reduce the quality of presentation for all elements included in a rendered image frame. Thus, if an end-user is trying to read text (e.g., in a role playing game), the text may appear blurry. As described below, the techniques described herein enable improved presentation of video game streams provided over the internet. For example, a server system may proactively adjust a quality of a video game stream (e.g., due to fluctuations in bandwidth, packet loss, and so on) while preserving the quality of user interface elements. Therefore, if an end-user's internet connection drops in speed temporarily, the server system can rapidly reduce the quality of video game gameplay while preserving the quality of the user interface elements. In this way, the user can be assured of high fidelity with respect to these user interface elements. For particular reductions in internet speed, prior systems may make text and user interface elements not merely blurry, but impossible to read during these reductions (e.g., text may fluctuate between being blurry and illegible).

Accordingly, in various embodiments, large amounts of data are automatically and dynamically calculated interactively in response to user inputs, and the calculated data can be efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated description herein are provided to illustrate specific embodiments of the disclosure and are not intended to be limiting.

FIG. 2C illustrates a block diagram of another example of generating an encoded gameplay stream.

FIG. 8A illustrates a block diagram of an example of generating an encoded gameplay stream with geometry information.

FIG. 8C illustrates another block diagram of an example of generating an encoded gameplay stream with geometry information.

FIG. 8D illustrates another black diagram of a user device generating enhanced video game gameplay.

DETAILED DESCRIPTION

Figure 1:
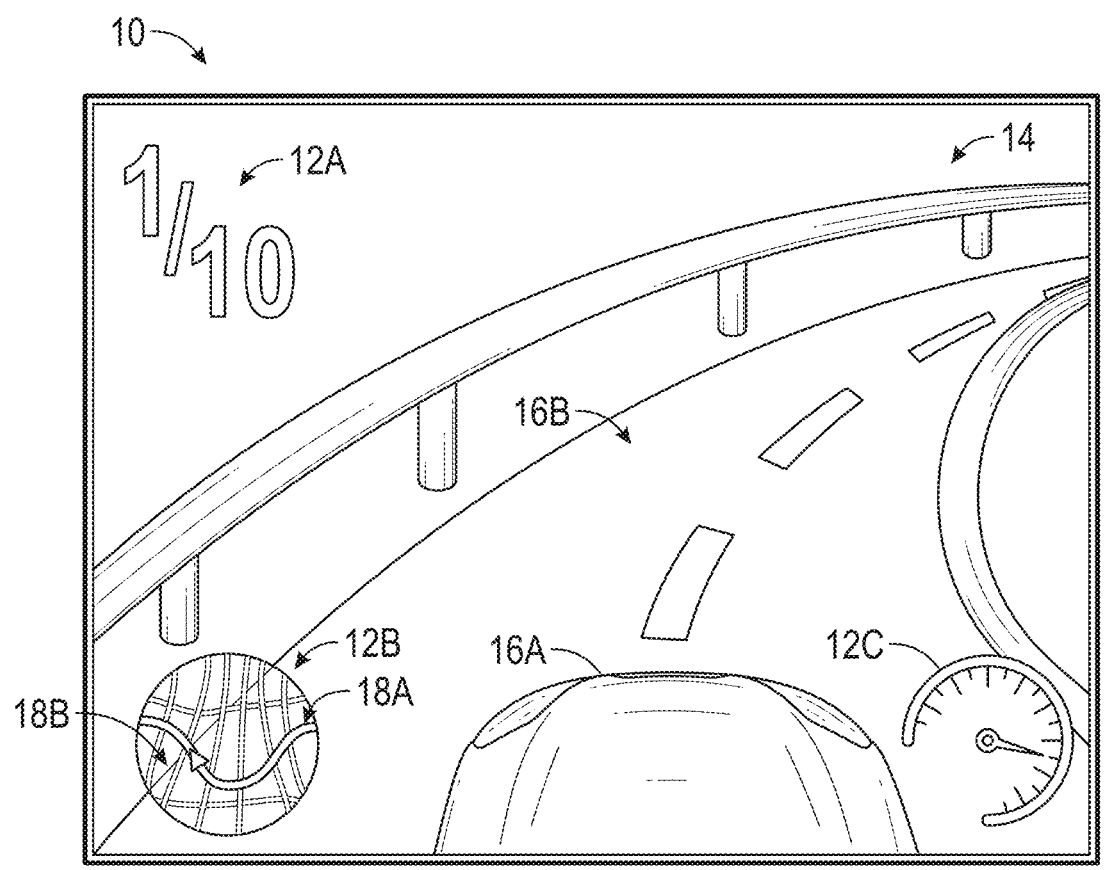
FIG. 1 illustrates an example video game scene.

The present disclosure describes embodiments of systems and processes for enhanced streaming of video games to users remotely playing the video games over a network (e.g., the Internet). A system described herein (e.g., the stream optimization system 100), can enable users to remotely play video games executing on the system. For example, the users may receive streaming video of real-time video game gameplay generated by the system, and may provide user input to control features of the streamed video. As an example, a user may utilize a user device to stream a role-playing video game. The user may provide user input to the user device, which can forward the user input to the system to update the role-playing video game. As will be described, advantageously the system can improve fidelity of particular portions of the streamed video game gameplay.

For example, the system can ensure that user interface elements (e.g., text, menus, and so on) are presented in high resolution (e.g., a resolution natively rendered by the video game). In this example, the system may adjust quality of non-user interface elements, such as the video game gameplay itself (e.g., characters, environments, and so on). That is, the system may adaptively adjust a bitrate of the portions of the streamed video related to these non-user interface elements while preserving the bitrate of the user interface elements. In this way, the user's perception of the reduction in quality may be reduced as any text, menus, and so on, may be appear in high quality. Thus, the system can adaptively adjust quality of the streamed video (e.g., based on bandwidth available to a user device receiving the stream) while preserving user interface elements.

While the user interface elements may be included in the streamed video at high quality, due to the techniques described herein a size associated with the streamed video (e.g., measured in megabytes per second) may be conserved. As described herein, the system can cause non-user interface elements occluded by, or behind, user interface elements to be reduced in quality in the streamed video. Since these non-user interface elements may be partially hidden, or otherwise adjusted in appearance by, the user interface elements, the system can reduce their quality as compared to other non-user interface elements. For example, a user viewing the streamed video may have a greater difficulty identifying specific details of a video game character partially covered by a user interface element. Thus, the system can encode these non-user interface elements to be more aggressively compressed or otherwise reduced in size. For example, a portion of a video game character under a user interface element may be more compressed than remaining portions of the video game character.

To more aggressively compress certain portions of the streamed video, the system may optionally utilize mask information for the user interface portions and/or the non-user interface portions. As will be described herein, mask information can indicate a degree to which each pixel of the user interface elements and/or non-user interface elements may be compressed. For example, gameplay elements that may be partially hidden or occluded via overlaid user interface elements may be reduced in quality.

As will be described below, the system can execute multitudes of video games based on requests from users. Video game output from these video games, for example display data which would otherwise be presented on a display of a user, may be provided by the system as a video game stream over the network to user devices of the users. The users may operate input devices, such as controllers, touch screen interfaces, keyboards, mice, and so on, to control the video games. User input provided to these input devices may be forwarded by the user devices to the system for processing. In this way, a user may play a video game which is remotely executing on the system.

An example video game stream may include encoded video generated from image frames rendered by a video game. For example, a video game may generate display data, such as successive image frames (e.g., 30, 45, 60, times per second), and this display data may be encoded. Example encoders can include H.264, MPEG-4, High Efficiency Video Coding (HEVC), VP8, VP9, and so on. Thus, the display data generated by the video game may be encoded to package the display data into information suitable for transmission over a network. Additionally, the display data may be encoded to reduce an amount of information which is being provided over the network (e.g., 3, 5, 15, 20, megabytes per second and so on). Thus, a burden on a bandwidth available to a user device may be reduced via the encoding.

As described above, the system may advantageously encode user interface elements differently than non-user interface elements. Thus, a user may receive streamed video with the user interface elements presented at a higher quality than non-user interface elements. Additionally, the system may intelligently include encoded user interface elements in streamed video if their appearance has modified or been removed since a prior inclusion.

For example, in a particular video game (e.g., a role-playing game), text may be presented. The system can separately encode this text as compared to video game gameplay (e.g., non-user interface elements). Since this text may be displayed for a threshold amount of time to afford time to read the text (e.g., 2 seconds, 3 seconds, and so on), the system may provide the text once and then indicate that a receiving user device is to present the text until instructed otherwise. In this way, the system can avoid unnecessarily encoding this text in the streamed video, thus reducing a size of the streamed video and conserving processing power and resources of the system. Optionally, the system may include metadata directed to this text. Example metadata can include metadata indicating an adjustment to a location of the text, or an adjustment to an appearance of the text.

As another example, and with respect to the particular video game described above, the system may update the inclusion of user interface elements periodically. For example, video game gameplay (e.g., non-user interface elements) may be encoded as described above (e.g., each image frame rendered by a video game may be encoded into a video stream). In contrast, the system may encode the user interface elements at a lesser cadence. For example, the system may encode user interface elements every 0.067 seconds, 0.1 seconds, 0.2 seconds, and so on. That is, the user interface elements may be slower to update than the video game gameplay itself. A user device may receive periodic updates to user interface elements, and may continuously present a last received user interface element until receipt of an updated user interface element. In this way, the user device can present potentially fast-paced action of the video game, and periodically update presentation of any user interface elements. As an example, and with respect to a role-playing game, a user interface element may include a health bar of a character. This health bar may be unlikely to update faster than every 0.067 seconds, 0.1 seconds, and so on, such that the system can reduce required bandwidth by unnecessarily excluding it from a stream.

Thus, the system described herein can enhance video game streaming through reductions in bandwidth and processing, and increases in user experience and the functioning of such video game streaming. While reference herein is made to video games, it should be understood that the techniques may be applied to different streaming content. For example, user interface elements, such as text, may be separately encoded in video streaming content. In this way, a streaming video (e.g., YOUTUBE® video) directed to use of a spreadsheet application may include example spreadsheets in the streaming video which are presented in high quality to a user. As the user's available bandwidth reduces, the other portions of the streaming video may be reduced in quality (e.g., a presenter may be reduced in quality, an environment in which the presenter is located, and so on).

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein, a video game is an electronic game that may execute on a user device, such as a dedicated console system (e.g., XBOX®, PLAYSTATION®), a laptop or desktop computer, a tablet, smart phone, and so on. A video game may further execute on a system (e.g., server system) that provides remote gameplay access to a user of a user device over a network (e.g., the internet). Example video games may include sports games (for example, football games, hockey games, basketball games, racing games, and the like), and so on.

As used herein, user interface elements may include elements included in image frames rendered by a video game that refer to status information, or provide information indicative of aspects of gameplay. The user interface elements may be an overlay over gameplay elements described below. Example status information may include a health of a character in a video game, statistics associated with the character, menus to enable modification of video game settings or to perform particular actions (e.g., save a game, exit a game, and so on). Example information indicative of aspects of gameplay may include an overlay map indicating locations of players, a radar element identifying proximate locations of characters, a player settings screen (e.g., in a role-playing game, a settings screen may enable adjustment of a characters' armor, weapons, player attributes), and so on. Examples of user interface elements are illustrated in FIGS. 1 and 2A-2C descried in more detail below.

As used herein, gameplay elements may include elements included in image frames rendered by a video game that are related to gameplay action. For example, user interface elements may be overlaid on the gameplay action and may be enable adjustments to the gameplay action or provide information describing aspects of the gameplay action. Example gameplay elements may include characters, non-playable characters, a game world or environment, and so on. Optionally, these gameplay elements may be modified or adjusted by the video game at a greater frequency than the user interface elements. For example, an environment may be adjusted as a user controlled character moves about a game world.

As used herein, a video game gameplay stream (herein also referred to as an encoded gameplay stream, gameplay stream, and so on) refers to a stream comprising encoded image frames generated by a video game. The video game gameplay stream may further include encoded audio. For example, a video gameplay stream may be an MPEG-4 video which, when decoded, represents display data and audio data generated by a video game. Optionally, a video game gameplay stream may comprise encoded image frames of either user interface elements or gameplay elements. That is, a multitude of video game gameplay streams may be generated, and a user device may decode and combine each stream for presentation to a user of the user device.

As used herein, mask information refers to information indicative of a compression or reduction in quality to be applied to particular portions of an image frame during encoding. Example mask information is illustrated in FIG. 2C, and described in more detail below. Mask information may comprise metadata associated with each image frame to be encoded into a video game gameplay steam. For example, the metadata may indicate a compression or reduction in quality to be applied to each pixel. As another example, the metadata may indicate a compression or reduction in quality to be applied to specific elements. In this example, the metadata may indicate elements, such as a portion of a character (e.g., an arm) or a portion of a user interface element, along with a compression or reduction in quality to be applied.

As another example, the mask information may be an image frame of the user interface elements (e.g., as illustrated in masks 116A-116B in FIG. 2C). In this example, a first mask information be associated with the gameplay elements, and a second mask information be associated with the user interface elements. The first mask information may be utilized to indicate a degree to which gameplay elements under user interface elements may be compressed or reduced in quality. For example, the first mask information may be rendered in gray scale, with the user interface elements rendered in respective shades of gray selected based on a compression or reduction in quality to be applied to gameplay elements under the user interface elements. The second mask information may be similarly be rendered in gray scale, with the user interface elements optionally rendered in white (e.g., to indicate no, or minimal, compression to be applied) with remaining elements rendered in black (e.g., to indicate that these elements can be compressed at a maximum). The mask information may optionally represent a selection of values in a particular range (e.g., between zero and one). For example each pixel may be assigned a particular selection from the particular range. This particular range may be represented as a single channel (e.g., grayscale), or optionally as multiple channels (e.g., red, green, blue).

As used herein in reference to user interactions with data displayed by a computing system, "user input" is a broad term that refers to any type of input provided by a user that is intended to be received and/or stored by a system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse. User input may optionally be provided to a user device utilized by a user, and the user device may provide the user input to a system (e.g., the stream optimization system 100) for processing.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

FIG. 1 illustrates an example video game scene 10 of a video game. The video game scene 10 may be an example of an image frame generated by a video game for presentation to a user of the video game. For example, the video game may be executed in dedicated hardware, such as a console system, executed using a laptop of personal computer, executed using a mobile device or tablet or wearable device, emulated using hardware (e.g., a development kit), or emulated using virtual components of a system (e.g., virtual CPU, GPU, memory, and so on, of a cloud computing system). Thus, the image frame may be presented locally via a display of a user device, or may be provided for presentation over a network (e.g., the internet) to a user device. With respect to the latter presentation, the video game scene 10 may be included in a video game gameplay stream presented on a user device, such that a user of the user device may remotely play the video game.

As illustrated in FIG. 1, the video game scene 10 includes gameplay elements of the video game, which in the example is a car racing video game. The example gameplay elements may be separated according to user interface elements 12A-12C, and non-user interface elements 14. The non-user interface elements 14 may include gameplay elements 16A-16B. As an example, gameplay element 16A may represent a car being controlled by a user of the video game. As another example, gameplay element 16B may represent a game world or environment in which the car is being driven (e.g., a race track). These gameplay elements 16A-16B may be rendered with great detail, and in high resolution (e.g., 3840×2160, 2040×1080, 1920×1080, 1280×720, and so on). Additionally, these gameplay elements 16A-16B may be rendered with post-processing effects to enhance lighting, reflection, textures, and so on of the elements 16A-16B. Thus, the gameplay elements 16A-16B may be realistically presented in the video game scene 10.

The user interface elements 12A-12C may be overlaid on the non-user interface elements 14 and may optionally be rendered more simply. For example, user interface element 12A (e.g., a user's place in a car race) may be rendered as one or more colors. That is, this user interface element 12A may be designed to be easily legible by a user of the video game. Similarly, user interface element 12C may be designed to be easily decipherable to indicate a speed at which the user's car is traveling. For example, the user interface element 12C may be designed to be distinguishable from the non-user interface elements 14 that are proximate to the user interface element 12C.

User interface element 12B may represent a location of the car in a game world of the video game. This user interface element 12B may similarly be distinguishable from underlying non-user interface elements 14. Optionally, the user interface element 12B may, at least in part, be rendered as transparent. For example, portion 18A may represent a track on which the car is driving, and may include a representation of the user's car. As another example, portion 18B may represent game world areas proximate to the track. Portion 18A may optionally be rendered as substantially opaque, while portion 18B may be at least partially transparent. In this way, the non-user interface elements 14 under this portion 18B may be partially visible.

As will be described in more detail below, a system described herein (e.g., the goal optimization system 100) may generate a video game gameplay stream to be provided to a user device, and enable remote play of the video game by a user of the user device. To ensure that the user device has sufficient available bandwidth to timely download the video gameplay stream, and provide user input to the system, the system can compress the video game gameplay stream. As an example, the video game scene 10 illustrated in FIG. 1 may be included in a video game gameplay stream. The system may compress the video game scene 10 during encoding of the video game scene 10 into the video game gameplay stream. As described above, the non-user interface elements 14 may include realistic detail, and may be rendered at a high resolution. Thus, in the video game gameplay stream, a threshold amount of information included in the stream (e.g., 70%, 80%, 90%) may be associated with the non-user interface elements 14. In contrast, and as described above, the user interface elements 12A-12C may be rendered to be easily legible by a user. While these elements may also be rendered at a same high resolution, the elements 14 will represent 30%, 20%, 10%, and so on, of information included in the stream.

Therefore, to retain easy legibility of the user interface elements 12A-12C, the system may retain these elements 12A-12C without any, or with less than a threshold, reduction in quality when provided in the video game gameplay stream. In contrast, the system may adjust a quality associated with the non-user interface elements 14. For example, the system may generate different video game gameplay streams, with each stream including the non-user interface elements 14 rendered at a respective bitrate. As the bandwidth available to a user device fluctuates, a different one of these streams may be selected to be provided to the user device. Since each stream may include the user interface elements 12A-12C rendered in high quality, the user will be assured to easily decipher the user interface elements 12A-12C.

Examples of encoding user interface elements 12A-12C separately from non-user interface elements 14 are described in more detail below with respect to FIGS. 2A-2B, 3 and 5. Optionally, during encoding the non-user interface elements 14 may be compressed according to a degree to which they will be visible. For example, user interface element 12A is positioned over a portion of the race track 16B. As illustrated, portion 18A of the user interface element 12B is rendered as substantially opaque. Therefore, the portion of the race track 16B under the portion 18A is not visible in the video game scene 10. In contrast, portion 18B of the user interface element 12B is partially transparent. Thus, the portion of the race track 16B under portion 18B is partially visible in the example of FIG. 1. For example, particular effects may be applied (e.g., shader effects) that modify an appearance of the portion of the race track 16B. As will be described below, with respect to FIGS. 2C and 3, the system may indicate that an encoder can compress, or reduce a quality of presentation for, the portion of the race truck under portion 18A greater than for portion 18B. Additionally, for portions of the non-user interface elements 14 not under user interface elements 12A-12C, the system can utilize a lesser compression. Thus, quality for non-user interface elements 14 partially hidden by user interface elements 12A-12C may be reduced since they will be less visible to the user.

Generating Encoded Gameplay Stream

Figure 2A:
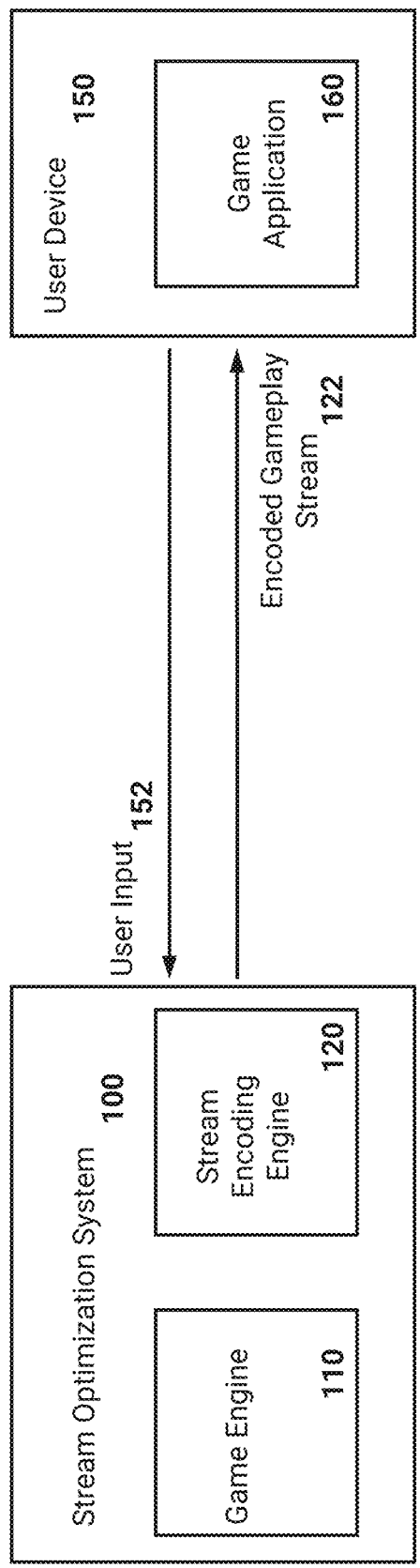
FIG. 2A illustrates a block diagram of an example stream optimization system in communication with a user device.

FIG. 2A illustrates a block diagram of an example stream optimization system 100 in communication with a user device 150. The stream optimization system 150 can enable the user device 150 to remotely play one or more video games that are executing on the stream optimization system 150. The user device 150 may include a computer system (e.g., a laptop, desktop computer), a mobile device (e.g., a smart phone, tablet), and so on. In this way, a user of the user device 150 may utilize potentially low-powered processing components to play video games that would otherwise require substantial processing power. For example, a user may utilize a smart phone to play modern video games that would otherwise require high-end central processing units (CPUs), graphics processing units (GPUs), large quantities of volatile memory (e.g., random access memory), and so on.

The stream optimization system 100 may be a system of one or more computers, or one or more virtual machines executing on a system of one or more computers. The stream optimization system 100 may form a cloud computing system that can respond to requests to remotely play video games from multitudes of user devices. The stream optimization system 100 may, for example, execute a version of each requested video game for each user. Optionally, each executed video game may be executed in a particular virtual machine and may be run with virtualized computing resources. Optionally, different video games may utilize different computing resources. For example, a first video game may be run with greater graphical processing power than a second video game. As another example, the stream optimization system 100 may assign additional virtualized computing resources to a particular virtual machine based on determined needs of the virtual machine. In this example, a user playing a video game may cause selection of a game setting to increase a resolution at which the video game renders image frames. The stream optimization system 100 may therefore assign additional virtualized computing resources to the particular virtual machine to satisfy the increased resolution.

The stream optimization system 100 includes a game engine 110 that can execute a video game, respond to user input 152 received from a the user device 150, and present rendered output from the video game to a stream encoding engine 120. As described above, the stream optimization system 100 may receive a request from the user device 150 to execute a particular video game. The stream optimization system 100 may then run the particular video game, for example emulate a software environment in which the particular video game would normally run. As an example, the particular video game may be desktop computer game (e.g., a 'PC video game'). In this example, the stream optimization system 100 may cause creation of a virtual machine that executes an operating system for which the particular video game was designed. As another example, the particular video game may be a console video game. In this example, the stream optimization system 100 may emulate an operating system associated with the console. Optionally, the stream optimization system 100 may utilize an operating system environment which is associated with a development kit or environment designed for the console. In this way, the game engine 110 may execute video games configured for different software environments.

As will be described, the stream encoding engine 120 can provide an encoded gameplay stream 122 to the user device 150 for presentation on the user device 150. In this way, a user of the user device 150 can view gameplay generated by a video game. The user device 150 may receive user input from the user, for example via a dedicated controller, via a touch-screen interface (e.g., on a mobile device), and so on. The user device 150 may provide the user input 152 to the stream optimization system 100 for processing. For example, the game engine 110 can receive the user input 152, and utilize the user input as would ordinarily be utilized (e.g., if the user was locally playing the video game). The game engine 110 may update state information of the video game, such as player location, game environment information, and so on. In response, the game engine 110 may update display data generated by execution of the video game. This updated display data may be provided to the stream encoding engine 120, which can provide the encoded gameplay stream 122 to the user device.

The stream optimization system 100 may provide the encoded gameplay stream 122 to the user device 150 utilizing one or more network protocols. For example, the stream 122 may be provided using application layer protocols, such as the Hypertext Transfer Protocol (HTTP), HTTP Secure (HTTPS), HTTP Live Streaming (HLS), Real-time Transport Protocol (RTP), Real-time Transport Control Protocol (RTCP), Real Time Streaming Protocol (RTSP), and so on. Additionally, the stream optimization system 100 may utilize an adaptive bitrate streaming technique to stream the encoded gameplay stream 122. To implement this technique, the stream optimization system 100 can detect a bandwidth available to the user device 150, and adjust a quality of the encoded gameplay stream 122 (e.g., in substantially real-time). The stream optimization system 100 can encode the stream 122 according to different bitrates, and the user device 150 may select from these different encodings depending on its available resources (e.g., bandwidth). An example adaptive bitrate streaming technique may include Dynamic Adaptive Streaming over HTTP (DASH), which can break content into a sequence of small HTTP-based file segments, with each segment containing a short interval of payback time of content. The stream optimization system 100 may provide these application layer protocols over transport layers including TCP, UDP, and so on. In this way, the stream optimization system 100 can provide rendered output from a video game as a steady stream 122 to the user device 150.

The user device 150 includes a game application 160 that can receive the gameplay stream 122, and present a decoded stream to a user of the user device 150. For example, and as will be described below, the encoded gameplay stream 122 may be encoded using an H.264 or H.265 encoder. In this example, the user device may utilize one or more standard, or 'off the shelf', H.264 or H.265 decoders. Advantageously, the user device may include a CPU or GPU with dedicated hardware (e.g., circuitry) which can decode an H.264 or H.265 stream. Thus, the user device may decode the gameplay stream 122 while preserving processing power and reducing power consumption.

The game application 160 may include specialized software, or an application (e.g., an 'app' downloaded from an electronic application store) that can communicate with the stream optimization system 100 (e.g. optionally via one or more intermediate systems). User input provided to the user device 150 may be provided to the stream optimization system 100 for processing. With respect to a mobile device that utilizes a touch-screen interface, the game application 160 may optionally translate between the touch-screen user input and user input commands ordinarily utilized by a video game. For example, the mobile device may present a representation of user input commands (e.g., an 'A' button, a triangle command, and so on). The user may interact with this representation, and the game application 160 may provide information to the stream optimization system 100 identifying the type of command selected based on the interaction.

Optionally, the game application 160 may be a web application associated with the stream application system 100. For example, the web application may present the gameplay stream 122 to the user, and may receive user input to be provided to the stream optimization system 100. The user may utilize, for example, a same controller as would ordinarily be utilized for the video game. In this example, the game application 160 may provide the user input to the stream optimization system 100.

As will be described in FIG. 2B below, the stream optimization system 100 may differently encode different portions of rendered output from the video game (e.g., user interface elements may be less compressed than gameplay elements). Thus, the stream optimization system 100 may adjust a quality, and therefor reduce a size, associated with the encoded gameplay stream 122.

Figure 2B:
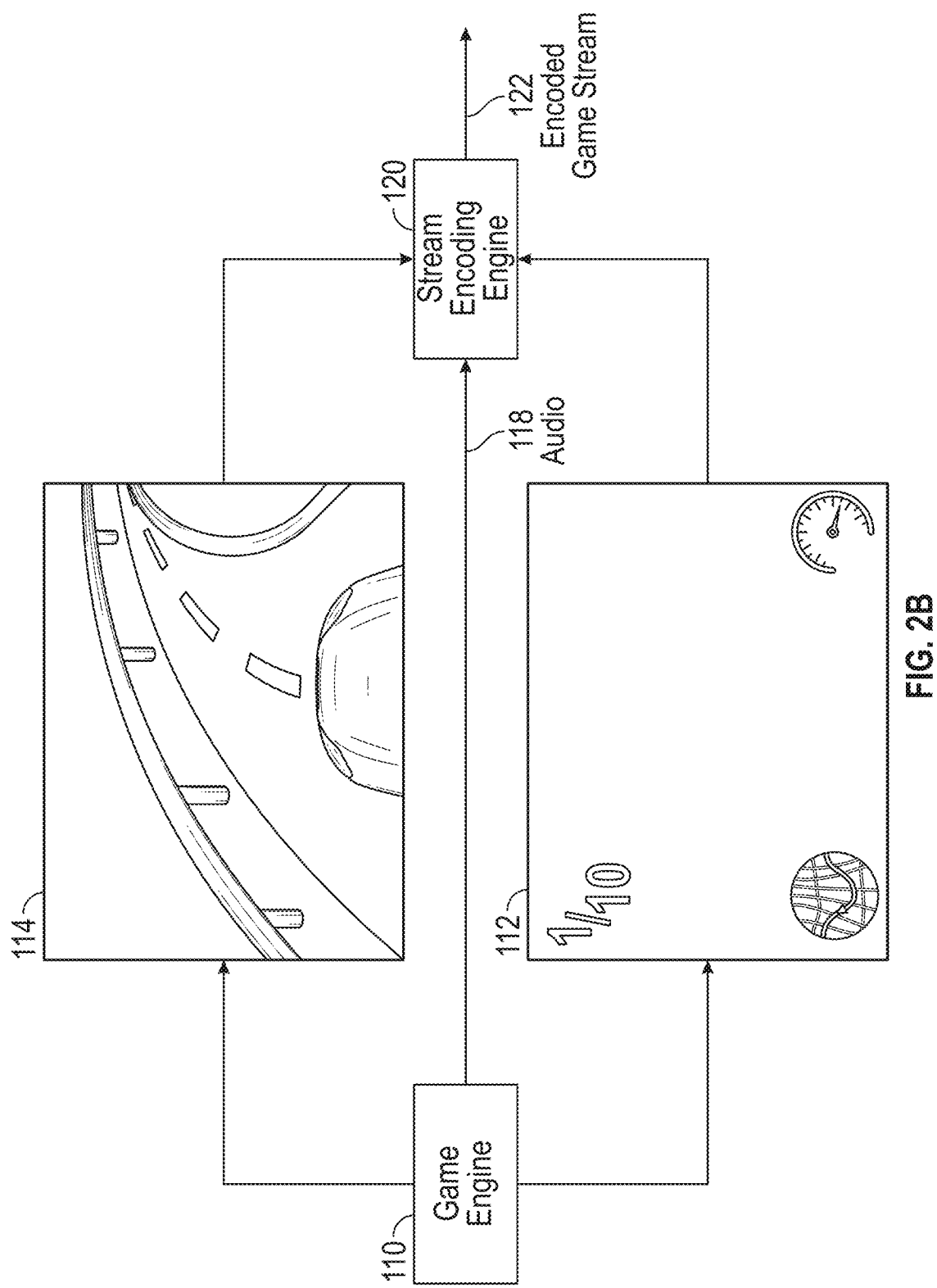
FIG. 2B illustrates a block diagram of an example of generating an encoded gameplay stream.

FIG. 2B illustrates a block diagram of an example of generating an encoded gameplay stream 122. As described above, the stream optimization system 100 includes a game engine 110 that can execute a video game, and generate rendered output from the video game. For example, rendered output can include image frames rendered at a particular, or variable, frame rate (e.g., 30, 45, 60, 90, frames per second). The frame rate may depend on computing resources available to the game engine 110. This rendered output may be provided to a stream encoding engine 120, which can encode the rendered output into an encoded gameplay stream 122 to be provided to a user device 150.

As described above, the stream optimization system 100 may separately encode portions of an image frame rendered by the video game. As illustrated in FIG. 1, the portions may include user interface elements 12A-12C and non-user interface elements 14. As will be described, the stream encoding engine 122 may encode the user interface elements 12A-12C with less compression, or at greater quality, than the non-user interface elements 14. Example encoding schemes may include MPEG-4, H.264, H.265, and so on.

The stream encoding engine 122 may further encode audio 118 generated by the game engine 110, and may further include audio 118 in the encoded gameplay stream. The audio 118 may include detailed three-dimensional audio, for example based on capabilities of the user device 150 to present such audio 118 (e.g., the user device 150 may provide information indicating a user has three-dimensional audio headphones). Optionally, and as will be described below with respect to FIGS. 7-10, the stream optimization system 100 may provide geometry information associated with the video game (e.g., triangle or polygon information for each image frame, for an entire level, and so on). This geometry information may be utilized by the user device 150 to enhance (e.g., improve) the encoded gameplay stream 122. For example, in contrast to the system 100 generating three-dimensional audio, the user device 150 may utilize the audio 118 and geometry information to generate the detailed three-dimensional audio. In this way, processing resources of the stream optimization system 100 may be conserved.

In the above-described example encoding schemes, the stream encoding engine 122 may cause compression, or reduction in quality of, rendered output from the video game. For example, in addition to encoding rendered image frames into a stream 122, the stream encoding engine 122 may adjust a bitrate associated with the stream 122. That is, the stream encoding engine 122 may adjust a bit depth utilized to encode the image frames into the stream 122. Optionally, the stream encoding engine 122 may maintain different versions of the stream 122 based on a bandwidth available to the user device 150. As described above, the user device 150 may utilize a particular version based on network conditions. Optionally, the stream encoding engine 122 may adjust a resolution associated with the rendered image frames. For example, the engine 122 may reduce a resolution that was natively rendered by the video game (e.g., the engine 122 may down-sample the rendered image). In this way, the stream encoding engine 120 may reduce a size associated with the stream 122.

FIG. 2B illustrates the video game image scene 10 (e.g., illustrated in FIG. 1) separated into two rendered image frames. A first image frame 112 represents the user-interface elements included in the video game image scene 10. A second image frame 114 represents the gameplay elements included the video game image scene 10. As illustrated in FIG. 1, the user interface elements 12A-12C are thus included as an overlay on the gameplay elements. Thus, a combination of the first image frame 112 overlaid on the second image frame 114 can result in the video game image scene 10. These image frames 112, 114, may be combined (e.g., packaged) by the stream encoding engine 120 and utilized to generate the encoded gameplay stream 122. Optionally, the image frames 112, 114, may be provided as separate encoded gameplay streams to the user device 150. In this example, the user device 150 may combine the received streams.

To generate the rendered image frames 112, 114, the game engine 110 may execute a version of the video game which has been customized. For example, when rendering a particular image frame (e.g., the video game scene 10), the video game may perform multitudes of draw calls to render portions of the particular image frame. Example draw calls may include rendering characters, environments, a crowd in a sports game, and so on. Additionally, draw calls may include rendering user interface elements. The video game may thus perform draw calls directed to gameplay elements (e.g., as illustrated in image frame 114), render the image frame 114. Subsequently, the video game may draw any user interface elements, for example as included in image frame 112.

The stream encoding engine 120 may encode image frame 114, and then switch to encoding image frame 112. As described above, the stream encoding engine 120 may combine the image frames 114, 112, subsequent to encoding, and utilize the combined image frames to generate the encoded gameplay stream 122. Similarly, the stream encoding engine 120 may alternate between image frames that illustrate gameplay elements and image frames that illustrate user interface elements. For example, the stream encoding engine 120 may generate the stream 122 as including image frame 114, and then subsequently in the stream including image frame 112. The user device 150 may extract (e.g., decode) image frames 112, 114, and present them to a user. Optionally, the stream encoding engine 120 may generate two or more gameplay streams. In this example, the stream encoding engine 120 may encode image frame 114 and include this encoded image frame in a first gameplay stream 122 directed to gameplay elements. When the video game draws user interface elements (e.g., as described above), the stream encoding engine 120 may switch to a second stream and included image frame 112 in this second stream. The user device 150 may receive these streams, and combine the streams. For example, the user device 150 may overlay decoded user interface image frames on corresponding decoded gameplay image frames.

Advantageously, the stream encoding engine may encode image frame 114, 112, differently. As described above, gameplay elements may be reduced in quality prior to being provided in the gameplay stream 122 to the user device 150. For example, a resolution associated with image frame 114 may be reduced. As another example, a bitrate associated with encoding the image frame 114 may be less than a first threshold. In contrast, the stream encoding engine may encode image frame 112 at a greater quality. For example, a resolution associated with image frame 112 (e.g., a resolution ordinarily output via the video game) may be maintained. Optionally, the resolution may be reduced according to a screen size, resolution, and so on, of the user device 150. For example, the resolution may be reduced if the user is utilizing a mobile device. Additionally, a bitrate associated with the encoding may be greater than a threshold, such as the first threshold. Since the user interface elements of image frame 112 may form a small portion of image frame 112, the stream encoding engine 120 can compress the image into a compact size while preserving a crisp resolution and bitrate.

As described above, the gameplay elements may be included in a same image frame 114, and the user interface elements may be included in a different image frame 112. Optionally, the gameplay elements may be separated into two or more image frames. For example, certain gameplay elements may benefit from a different compression, or reduction in quality. With respect to a sports games, particular video game characters may benefit from provided in the gameplay stream 122 at a greater quality than other video game characters. As an example, a character being controlled by a user may benefit from being encoded at a higher quality than a non-playable character. That is, the user's eye may be drawn to their own character thus reducing his/her visual acuity with respect to other players in the periphery (e.g., away from a fovea of the user's eye). Similarly, a crowd included in the sports game may be encoded at a reduced quality than the characters. Similarly, particular user interface elements may be separated into two or more image frames. For example, a user interface element that includes text may have a greater benefit for being presented in high quality than a user interface element that does not. As another example, a user interface element that includes text may be separated into distinct portions. A first portion may include the text, and a second portion may include a remainder of the user interface element. The stream encoding engine 120 may optionally encode these portions at different qualities.

Thus, the stream encoding engine 120 may maintain a hierarchy associated with rendering particular elements. One or more rules may be utilized by the stream encoding engine 120 to create additional image frames to be encoded separately than other image frames. Once encoded, the stream encoding engine 120 may similarly combine (e.g., package) the image frames together, and utilize the combined image frames to generate the encoded gameplay stream 122. Optionally, once encoded the stream encoding engine 120 may combine image frames of a same type (e.g., all image frames with user interface elements), and provide two streams 122 to the user device 150 as described above. In this example, the stream encoding engine 120 may create additional image frames via monitoring of draw calls from the game engine 110. For example, the stream encoding engine 110 may switch causing particular elements to be included in particular image frames, and may create new image frames. As another example, the game engine 110 may create multitudes of image frames through rules indicating elements that are to be included in separate image frames. Optionally, the stream encoding engine 122 may provide a number of streams based on a number of image frames. The user device may decode these image frames, and extract the image frames for combination. Optionally, information indicating a layer hierarchy may be provided to the user device 150. In this way, the user device 150 can identify which images are to be overlaid on other images.

Thus, via the techniques described above, the user device 150 may receive the encoded gameplay stream 122, or optionally gameplay streams, and may present the stream to a user. Since the user interface elements are encoded at a same or higher quality than the gameplay elements (e.g., depending on available bandwidth), the user can easily view the user interface elements.

Mask Information

FIG. 2C illustrates a block diagram of another example of generating an encoded gameplay stream. As described above, in addition to encoding gameplay elements and user interface elements to reduce a size associated with a gameplay stream 122, the stream optimization system 100 may more greatly reduce a quality of portions of gameplay elements hidden via user interface elements. For example, FIG. 1 illustrates a video game scene 10 in which a user interface element 12B is positioned over gameplay elements (e.g., a portion of a road). As will be described below, the stream optimization system 100 may reduce a quality of this portion of the road to a greater degree than gameplay elements not included under user interface elements.

FIG. 2C illustrates first mask information 116A and second mask information 116B. As described above, the mask information 116A can indicate a compression or reduction in quality to be applied to portions of image frame 114 which includes the gameplay elements. For example, the mask information can indicate a degree to which each pixel of image frame 114 can be compressed. Optionally, the mask information 116B can indicate a compression or reduction in quality to be applied to portions of image frame 112. Mask information may be generated, for example, from the game engine 110. That is, the game engine 110 may indicate how occluded, covered, visible, and so on, portions of image frames 112, 114 are.

As illustrated, mask information 116A includes representations of the user interface elements included in image frame 112. Since the user interface elements are overlaid on top of gameplay elements, particular portions of the gameplay elements will be less visually apparent to a user (e.g., as described above). Therefore, the mask information 116A indicates a measure of how affected image frame 114 will be once the user interface elements are overlaid when presented on the user device. To indicate the measures, the mask information 116A may graphically depict image frame 112 modified to adjust portions of each user interface element. For example, each pixel may be assigned a particular a color, such as a gray scale color, with darker colors representing a greater measure. Thus, a portion of image frame 114 that is under a darkly colored user interface element will be more hidden, or affected, than a portion of image frame 114 that is under a lighter color.

Mask information 116A includes user interface element 232 as a particular color associated with hiding gameplay elements (e.g., black, or substantially black). As described above, the gameplay elements included under this user interface element will be substantially hidden (e.g., the user interface element may be opaque). Similarly, user interface element 234 includes a user interface element also colored as the particular color. Thus, when encoding image frame 114, the stream encoding engine 120 may more aggressively reduce a quality of portions of image frame 114 that will appear under user interface elements 232 and 234. Optionally, the stream encoding engine 120 may eliminate these portions (e.g., provided padded zeros, and so on, which when compressed may be substantially reduced in size).

The mask information 116A further includes user interface element 12B. As illustrated, user interface element 12B includes two portions 236, 238, which are colored differently. Portion 236 is a particular color associated with hiding gameplay elements (e.g., black, as described above). Thus, this portion 236 may appear as opaque when presented to a user. In contrast, portion 238 is a different color (e.g., a shade of gray). Therefore, this portion 238 may be visible to the user of the user device 150 but may be less legible than other gameplay elements. The portion 238 may appear as slightly transparent, translucent, or with a particular effect applied to it (e.g., an appearance of water or glass). Thus, the stream encoding engine 120 may compress these portions 236, 238, differently from each other. For example, the engine 120 may reduce the quality of portion 236 greater than portion 238.

Similarly, when encoding image frame 114 the stream encoding engine 120 may compress portions of the image frame 114 that are not under any user interface elements (e.g., represented in white 240) according to a normal compression or reduction in quality. For example, normal compression based on available bandwidth to the user device 150 as described in FIG. 2B. Thus, the stream encoding engine 120 may further reduce a size associated with the stream 122 by adjusting portions that will be less visible to the user.

Mask information 116B may, as described above, graphically depict image frame 112 modified to indicate compression to be applied to image frame 112. As illustrated in the mask information 116B, the user interface elements of image frame 112 are represented as a same color (e.g., white). Thus, the stream encoding engine 120 can limit, or eliminate, a compression or reduction in quality to be applied to these user interface elements. In contrast, the remainder of mask information 116B is indicated as a particular color (e.g., black) indicating that these portions of image frame 112 may be compressed at a maximum (e.g., discarded, padded zeros utilized, and so on). While the user interface elements are represented as a same color, it should be understood that different user interface elements, or different portions of user interface elements, may be different colors. For example, a first user interface element that includes text may be represented as white. In this example, a second user interface element (e.g., a speedometer 12C) may be rendered as a particular shade of gray. Thus, the stream encoding engine 120 may optionally reduce a quality of this second user interface element.

Some example compression or encoding techniques may separate an image frame into particular M×N pixel blocks. For example, image frame 114 may be separated into 8×8 pixel blocks, and each block then compressed. When compressing image frame 112, the stream encoding engine 120 can ensure that all portions of a user interface element are not compressed. That is, if a portion of a user interface element extends into a particular M×N block, and the remainder of the M×N block is indicated as being compressible (e.g., at a maximum), then the stream encoding engine 120 may reduce a quality of this block. Therefore text, such as the edges of text, may be compressed and appear blurry. The stream encoding engine 120 may therefore ensure that any block that includes a user interface element (e.g., a block with a white pixel) is not compressed or reduced in quality. Optionally, the stream encoding engine 120 may not compress or reduce in quality any block that includes only certain user interface elements (e.g., text, a map identifying locations of players—for example represented as dots, a radar user interface element, and so on).

Example Process Flows

Figure 3:
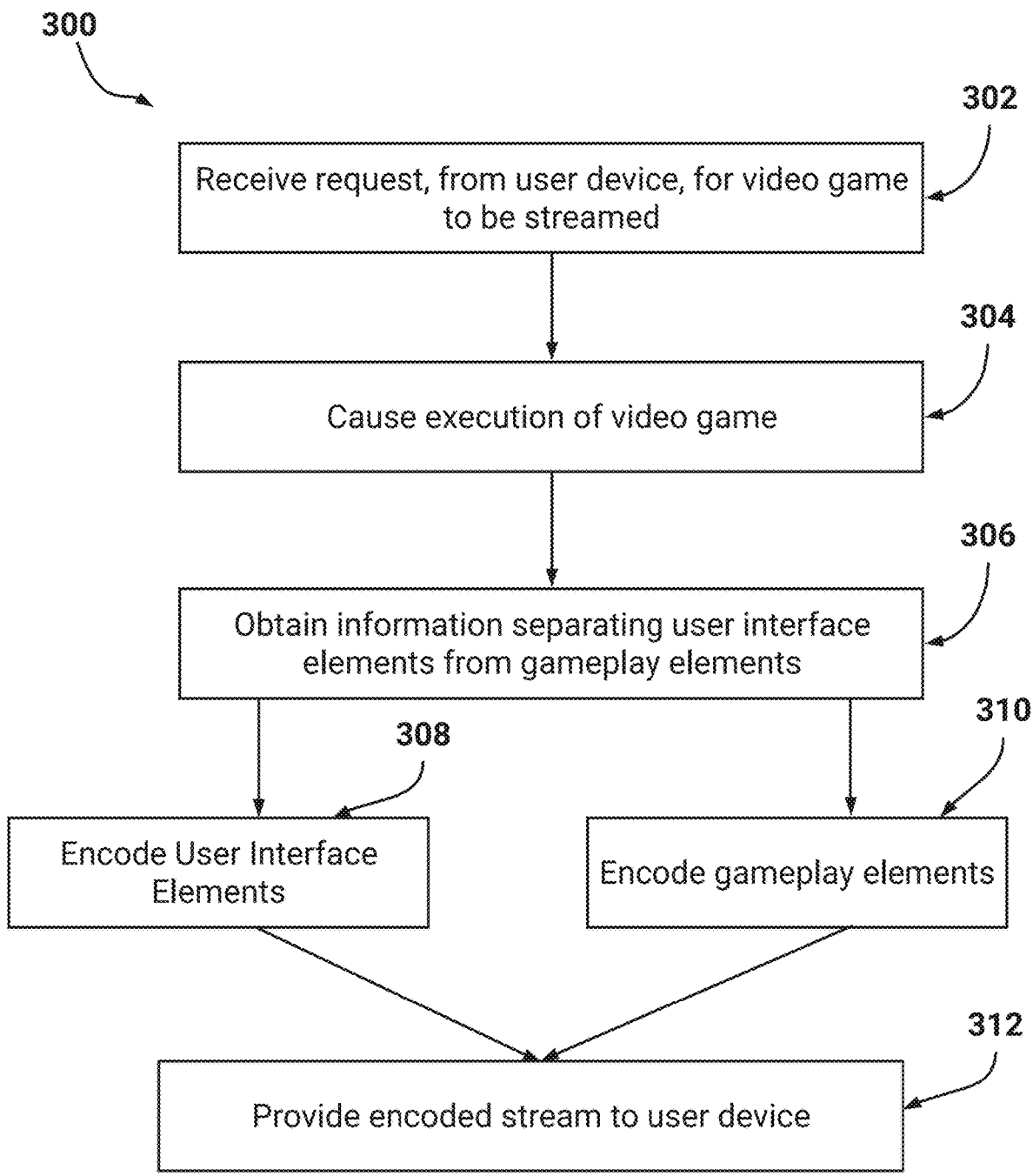
FIG. 3 illustrates a flowchart of an example process for providing an encoded gameplay stream to a user device.

FIG. 3 illustrates a flowchart of an example process 300 for providing an encoded gameplay stream to a user device. For convenience, the process 300 will be described as being performed by a system of one or more computers (e.g., the stream optimization system 100).

At block 302, receives a request from a user device for a video game to be streamed. As described above, the system can receive a request from a user of the user device to remotely play a particular video game via the system. Optionally, the request may identify information associated with the user device. Example information may include a type of the user device (e.g., a laptop or desktop computer, a mobile device, and so on), a display size and/or resolution, a measure or indication of network speed or bandwidth available to the user, and so on. This example information may be utilized by the system to inform a resolution and/or compression to be applied to rendered output from the video game.

At block 304, the system causes execution of the video game. The system may execute the video game, for example in a virtual machine. The virtual machine may optionally have virtualized resources which may be relied upon by the video game. Optionally, the system may emulate an operating system environment associated with the video game.

At block 306, the system obtains information separating user interface elements from gameplay elements. As the video game executes, the system can obtain output rendered by the video game. As described above, the video game may render elements using draw calls and then update (e.g., paint) the elements onto an image frame. The system may obtain an image frame that includes the user interface elements, and a different image frame that includes the gameplay elements.

At blocks 308 and 310 the system encodes the user interface elements and gameplay elements. The system can compress an image frame that includes the gameplay elements to a greater degree than an image frame that includes the user interface elements. Optionally, the system may adjust a resolution associated with the gameplay elements (e.g., down sample the image frame). Thus, the user may view the user interface elements in high quality, while the gameplay elements are reduced according to need (e.g., based on network speed available to the user device). Some example rendered image frames from the video game may not include user interface elements. Therefore, the system may only compress the gameplay elements for these rendered image frames.

At block 312 the system provides an encoded stream to a user device. The system may utilize the compressed image frames for inclusion in an encoded stream being provided to the user device. The user device may provide user input associated with the video game, and the system may process this user input to enable gameplay of the video game.

Figure 4:
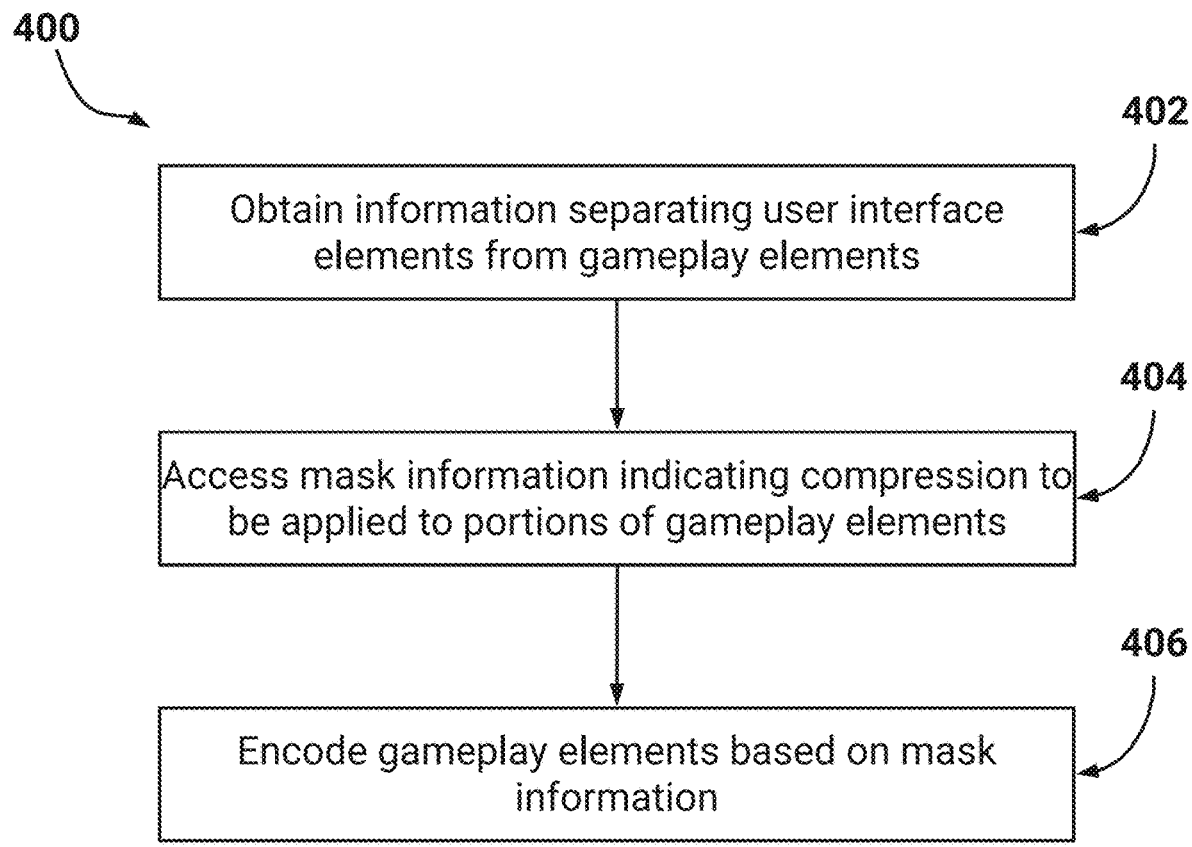
FIG. 4 illustrates a flowchart of an example process for encoding an electronic gameplay stream based on mask information.

FIG. 4 illustrates a flowchart of an example process 400 for encoding an electronic gameplay stream based on mask information. For convenience, the process 400 will be described as being performed by a system of one or more computers (e.g., the stream optimization system 100).

At block 402, the system obtains information separating user interface elements from gameplay elements. As described above, with respect to at least FIG. 3, the system can obtain an image frame that includes gameplay elements and an image frame that includes user interface elements.

At block 404, the system accesses mask information. As described in FIG. 2C, the system can utilize mask information to identify a compression, or reduction in quality, to be applied to each pixel of the gameplay elements. For example, pixels of gameplay elements that are partially, or fully, hidden under user interface elements may be adjusted in quality below that of other gameplay element pixels. While FIG. 2C illustrates the mask information as being a graphical representation of the user interface elements, it should be understood that the system may utilize non-visual metadata information. For example, the metadata may define locations of user interface elements along with measures indicating compressions, or reductions in quality, to be applied to gameplay elements at those locations.

At block 406, the system encodes the gameplay elements based on the mask information. The system may compress the gameplay elements, such as a rendered image frame from the video game that solely includes the gameplay elements (e.g., the non-user interface elements). This compressed image may then be provided for inclusion in a stream to a user device. In this way, a size associated with the stream can be reduced while the user's perception of any reduction in visual fidelity of the stream can be avoided.

Figure 5:
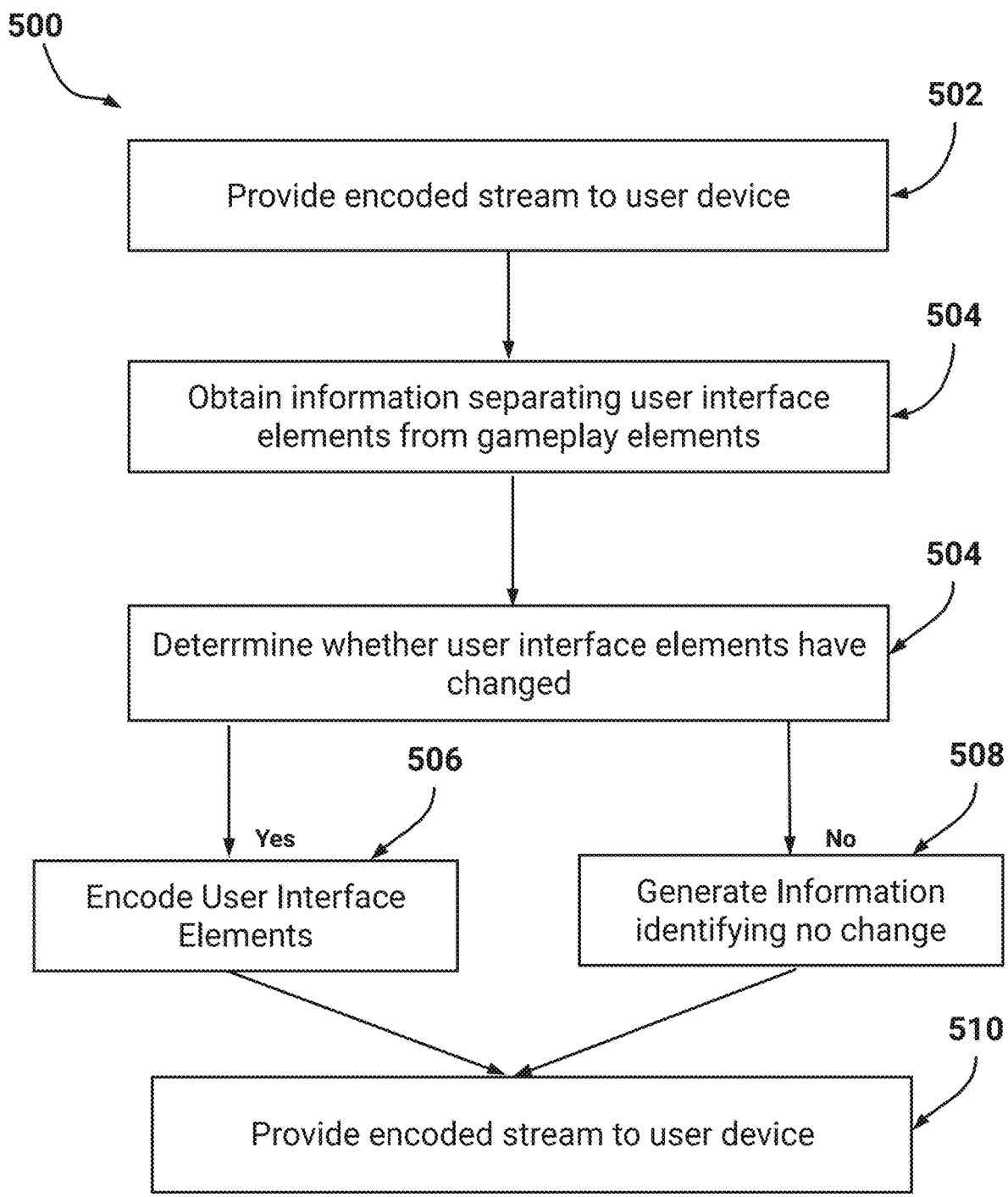
FIG. 5 illustrates a flowchart of another example process for providing an encoded gameplay stream to a user device.

FIG. 5 illustrates a flowchart of another example process 500 for providing an encoded gameplay stream to a user device. For convenience, the process 500 will be described as being performed by a system of one or more computers (e.g., the stream optimization system 100).

As described above, the system may generate a gameplay stream to be provided to a user device. The gameplay stream can include an encoded stream of rendered image frames obtained from an executing video game. For example, the encoded stream may include a stream of gameplay elements and user interface elements as included in image frames rendered at 30, 50, 60, and so on frames per second by the user device. Since the user interface elements may not update as often as gameplay elements, for example a health bar or a menu may be included in rendered image frames for several seconds without being updated in appearance by the video game. The system may therefore reduce a size of the stream by excluding user interface elements from the gameplay stream until they change.

At block 502, the system provides an encoded stream to the user device. As described above, the system may generate a gameplay stream to be decoded on the user device. The example gameplay stream may include gameplay elements and user interface elements as described above.

At block 504, the system obtains information separating user interface elements from gameplay elements, and at block 506 the system determines whether user interface elements have changed. For example, the system can determine whether user interface elements have changed since last being provided in the gameplay stream. To make this determination, the system may store an image frame (e.g., image frame 112) with the user interface elements previously provided in the gameplay stream. The system may then compare this stored image frame to a new image frame with the current user interface elements. If there is any distinction, the system may determine to update the stream with the current user interface elements. Additionally, as described in FIGS. 2C and 4, the system may utilize mask information to compress particular portions of gameplay elements to a greater degree than other gameplay elements. If the system determines that there has been no update to the user interface elements, the system can utilize the stored image frame and prior mask information to adjust quality of the current gameplay elements. Similarly, if the system determines that there has been an update, the system can utilize the current user interface elements and mask information as described in FIGS. 2C and 4.

Upon a positive determination, at block 506 the system can encode the user interface elements for inclusion in the gameplay stream. Upon a negative determination, at block 508 the system can optionally include information in the stream indicating no change. A user device may receive this included information, and may retain the previously received user interface elements. For example, the user device may update the gameplay elements, and overlay the previously received user interface elements on the updated gameplay elements. As described above, the user device may receive two gameplay streams. A first gameplay stream may include the gameplay elements, and a second gameplay stream may include the user interface elements. Thus, in this example the user device can retain the previously received user interface elements and overlay them on the current gameplay elements.

At block 510 the system provides a stream to the user device. As described above, the system may provide a first stream that includes user interface elements and a second stream that includes gameplay elements to the user device. Optionally, these streams may be packaged together (e.g., along with sync or timing information), and the user device may receive the packaged stream. Upon receipt, the user device can decode the streams and present the gameplay to a user.

Figure 6:
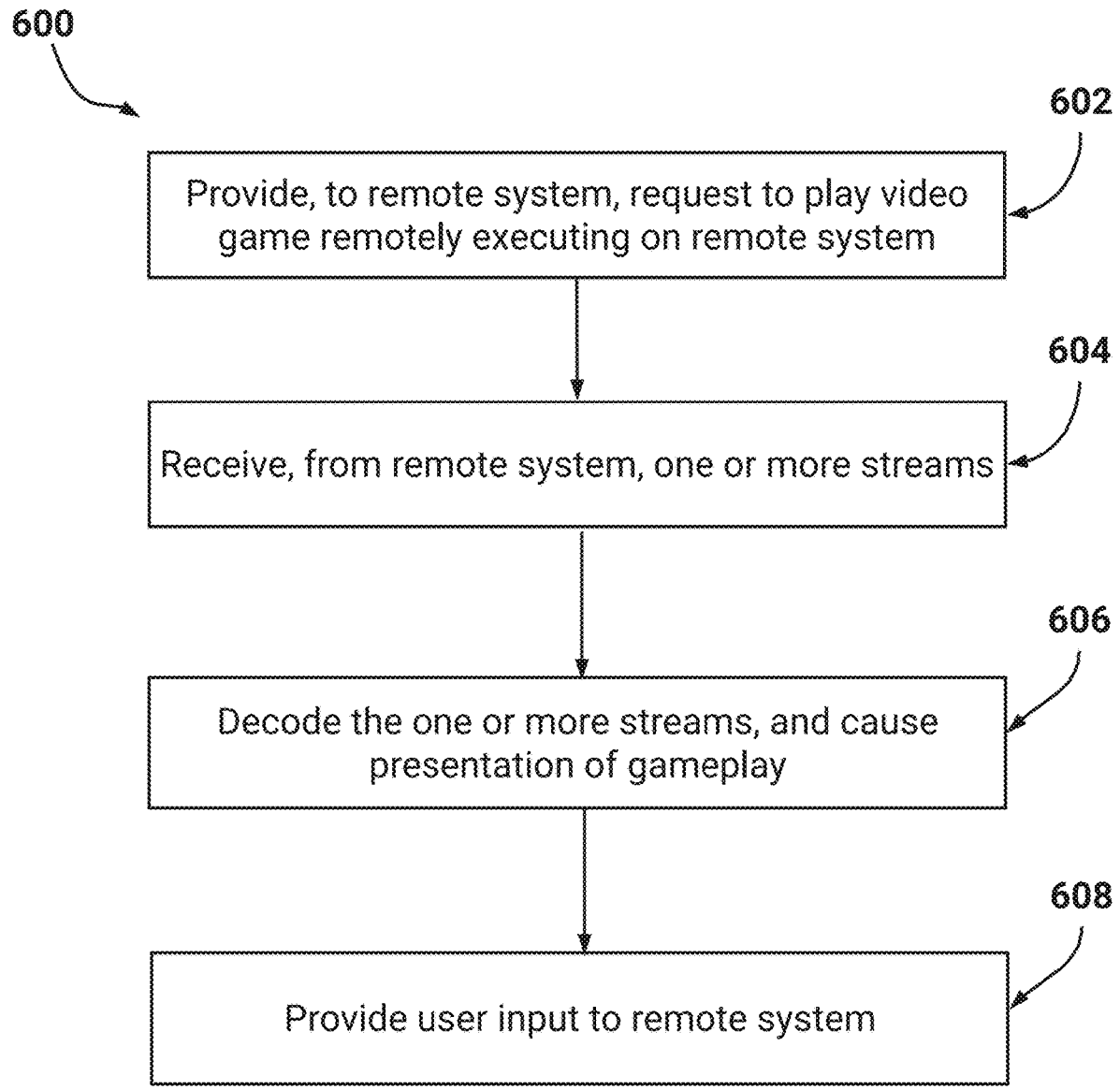
FIG. 6 illustrates a flowchart of an example process for playing a streamed electronic game on a user device.

FIG. 6 illustrates a flowchart of an example process 600 for playing a streamed electronic game on a user device. For convenience, the process 600 will be described as being performed on a user device of one or more processors (e.g., the user device 150).

At block 602, the user device provides a request to play a video game executing remotely on a remote system (e.g., the stream optimization system 100). The user device may execute a particular application (e.g., application 160 as described in FIG. 1), and the application may provide the request to the remote system. The application may optionally include information associated with the user device, such as a type, display size, resolution, and so on, and optionally authentication information associated with a user (e.g., user account information).

At block 604, the system receives one or more gameplay streams from the remote system. As described above, the user device may receive a first stream that includes gameplay elements, and a second stream that includes user interface elements. The user device can decode the streams (e.g., using a software or hardware decoder), and can combine the streams. For example, the user interface element stream may include pixel information, such as color information and transparency information. The user device can utilize this information to overlay (e.g., blend) the user interface elements on top of the gameplay elements. Once combined, the user device can present the combination to the user. Optionally, the user device may select from among one or more streams generated by the remote system according to a bandwidth available to the user device. For example, as a network speed reduces, the user device may select a gameplay element stream generated using a lower bitrate. In this example, the received user interface element stream may still be of a high bitrate (e.g., as described above).

At block 608, the user device provides user input to the remote system. As described above, a user of the user device may provide user input directed to the video game to the user device. The user device may transmit this user input to the remote system for processing, such that the user can play the video game.

Client-Side Post Processing

As described in FIGS. 1-6 above, a system that enables remote play of video games via streaming may separately compress user interface elements from underlying gameplay elements. For example, the user interface elements may be at a higher quality than the underlying gameplay elements. Thus, a user of a user device which receives the stream may view high quality user interface elements over adaptively compressed gameplay elements.

Since the system may service multitudes of users (e.g., hundreds of thousands of users, millions of users), the processing power required by the system may be immense. Additionally, the power requirements may similarly be immense. For example, the system may include large quantities of high-end CPUs and GPUs, along with a large amount of non-volatile and volatile memory. Modern games may cause these components to run at a high clock speed and at high voltage (e.g., the modern games may stress these components). As the number of users increases, powering these components and keeping them cool may present a great technical challenge. Additionally, ensuring a sufficient quantity of these components may also present a technical hurdle. For example, monitoring software or systems may be required to ensure that video games are executing correctly (e.g., the video games are being run at a playable frame rate with impressive graphical effects).

Described below are techniques to reduce a burden on a system (e.g., the stream optimization system 100 or a different remote system). As will be described, the system may provide gameplay streams to user devices (e.g., as described above), along with information sufficient to enable the user devices to perform post-processing effects on the decoded gameplay streams. For example, a user device (e.g., a desktop computer) may include a CPU and GPU with a processing capacity greater than a threshold (e.g., greater than a threshold quantity of teraflops). These components may, in a normal streamed video game, not be utilized to a great extent. That is, the user device may receive gameplay streams, decode the streams, and present the decoded streams to a user. As will be described below, the user device may instead utilize the components to perform post-processing effects to enhance the gameplay stream.

As an example, the system may provide a gameplay stream along with geometry information associated with the video game. The geometry information may include triangle or polygon information associated with the video game, such as geometry information of a level being played. The user device may decode the gameplay stream and obtain a particular image frame to be presented to a user of the user device. The geometry information may describe geometry information associated with the particular image frame. For example, if the user is playing a race car game then the geometry information may include triangle or polygon information related to a race track, the various cars being driven, and so on. Based on this geometry information, the user device may perform post-processing of the particular image frame. Example post-processing may include performing a variant of global illumination to enhance realism of the lighting included in the particular image frame. For instance, the user device may perform an ambient occlusion process. Additional post-processing may include generating three-dimensional positional audio based on audio received from the system and the geometry information. In this example, the system may provide information associated with sound emitters, such as their locations. The system may then determine three-dimensional audio based on the geometry information and the sound emitter locations.

Thus, the system may offload certain processing (e.g., post-processing effects) onto user devices capable of performing the processing. In this way, the system may leverage existing processing power of the user devices to reduce a burden the system and ensure proper performance and uptime for users. For user devices that lack sufficient processing power, such as mobile devices, the system can perform post-processing itself or eliminate particular post-processing effects.

In addition to conserving system-level resources, the client-side post-processing scheme described herein may improve visual fidelity of video games. For example, the system may compress a gameplay stream (e.g., as described above). Thus, if the system performed ambient occlusion or another post-processing effect, these effects would be similarly compressed by the system. Via the user device performing certain post-processing steps, the user device may itself enhance the stream. These enhancements will be performed locally, so they will not undergo the compression described above. In this way the presented video game gameplay may appear in higher quality.

Figure 7:
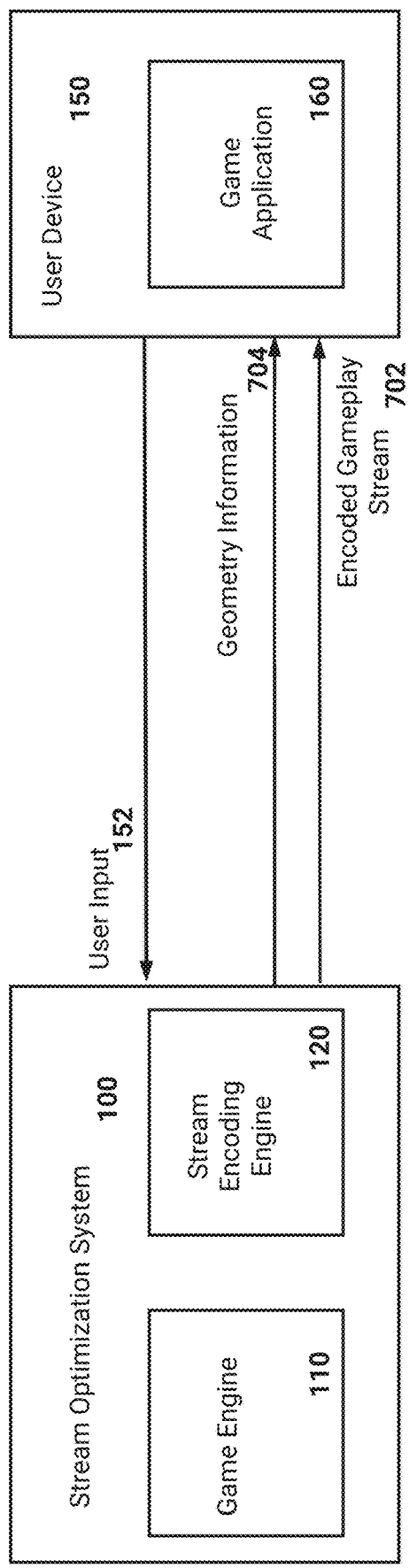
FIG. 7 illustrates another block diagram of a stream optimization system.

FIG. 7 illustrates another block diagram of a stream optimization system 100. While reference herein is made to the stream optimization system 100, it should be understood that the techniques described in FIGS. 7-10 may be utilized by different systems.

As illustrated in FIG. 7, the stream optimization system 100 may provide an encoded gameplay stream 704, which may be similar to the encoded gameplay stream 122 described above, to the user device 150. Additionally, the stream optimization system 100 may provide geometry information 702 associated with the encoded gameplay stream 122. As will be described in more detail below, the geometry information 702 can enable the user device 150 to perform particular post-processing effects on the gameplay stream 704 to provide various visual or auditory enhancements. Example geometry information 702 may include information identifying locations of triangles that form a geometry of the video game. For example, the information 702 may identify an X, Y, and Z, coordinate of each corner of a respective triangle.

An example of geometry information 702 may include information indicative of triangles included in each rendered image frame encoded in the gameplay stream. This example geometry information 702 is referred to herein as 'camera view geometry'. Since this geometry information 702 describes geometry specific to a rendered image frame, the geometry information 702 is limited to a camera view as generated by the video game. Another example of geometry information 702 may include information indicative of triangles included in a game world environment. For example, the geometry information may include triangle information for an entire level of the video game, or a portion of the level that is at least a threshold volume in the game world. This example geometry information 702 is referred to herein as 'level geometry'. As will be described below, with respect to FIGS. 8C-8D, the stream optimization system 100 may provide level geometry information to the user device 150 subsequent to receipt of a request to play a video game. The stream optimization system 100 may therefore pre-load this level information prior to initiation of gameplay of the requested video game. Optionally, the stream optimization system 100 may load the level information in the background during initial gameplay. Once the level information is fully received, the user device 150 may utilize the level information to perform post-processing effects.

As will be described below, the stream optimization system 100 may ascertain a processing power available to the user device 150, and if sufficient to perform post-processing effects, the system may provide the geometry information 702 to the user device 150. The geometry information 702 may be provided as a separate stream to which the user device 150 may subscribe. If the user device's available processing power reduces, for example due to other processes running on the user device, user device 150 may stop performing post-processing. In this example, the stream optimization system 100 may instead perform the post-processing effects prior to providing a gameplay stream. As another example, if the user device indicates it has less than a threshold battery remaining (e.g., a laptop may be played without being plugged into a wall socket, a tablet may be running low on battery), then the user device may similarly stop performing post-processing.

Utilization of Camera View Geometry

FIG. 8A illustrates a block diagram of an example of generating an encoded gameplay stream 704 with geometry information 710. As described above, a game engine 110 included in the streaming optimization system 100 may execute a video game and generated rendered image frames. These rendered image frames may optionally be separated according to user interface elements and gameplay elements, and separately compressed as described in FIGS. 1-6. In the example of FIG. 8A, the game engine 110 has rendered a particular image scene 712 (e.g., a particular image frame) and generated geometry information 710 for this rendered image scene 712. Based on a determination that the user device 150 has access to greater than a threshold processing power, and optionally greater than an available bandwidth, the game engine 110 may not perform certain post-processing effects. Rather, as will be described below the stream optimization system 100 may provide geometry information 710 to enable the user device 150 to perform such post-processing.

The rendered image scene 712 includes a car being driven on a race track. As described above, to generate the rendered image scene 712 the video game may perform multitudes of draw calls. For example, example draw calls may include drawing a car, a race track, painted lines on the race track, a wall surrounding the race track, and so on. When a draw call is issued, the video game may obtain geometry information associated with an element to be rendered. Therefore, when generating the rendered image scene 712 the video game may have access to geometry information specific to elements included in the rendered image scene 712. In this way, while rendering image scenes the video game may accumulate the geometry information associated with each element being rendered. The video game can then utilize this accumulated geometry information to generate the geometry information 710.

Optionally, the geometry information 710 may be simplified, for example by the game engine 110. The geometry information utilized to generate the rendered image scene 712 may include more triangles than is necessary to perform post-processing effects. For example, each triangle illustrated in example of FIG. 8A may be subdivided into smaller triangles when the video game generates the rendered image scene 712. This more complex geometry information may increase a complexity associated with a user device 150 performing post-processing. Thus, the geometry information 710 may be reduced in complexity. As an example, particular triangles may be combined into a larger triangle. As another example, the video game may have lower fidelity geometry information stored for game world environments. This lower fidelity geometry information may be utilized as the geometry information 710 in lieu of the more detailed geometry information that may be utilized when the video game renders output.

The stream encoding engine 120 may receive the geometry information 710 and rendered image scene 712, and generate an encoded gameplay stream 704 to be provided to the user device 150. Additionally, the geometry information for the scene 702 may be similarly provided to the user device 150. For example, the stream encoding engine 120 may package the geometry information 710 into a form suitable for transfer via the network protocols described above in FIG. 2A. As will be described below, the user device can utilize the geometry information to perform post-processing effects that rely on camera view geometry information. For example, the user device 150 may perform an ambient occlusion process to enhance lighting included in the rendered image scene 712. In this example, the game engine 110 may further indicate locations of lights that are lighting the rendered image scene 712, optionally with information associated with each light (e.g., a type of light). As another example, the user device 150 may perform an anti-aliasing process. Additional post-processing effects may be similarly performed and fall within the scope of the disclosure. For example, motion blur, lens flares, high dynamic range rendering, bloom, bump mapping, and so on, may be applied.

Figure 8B:
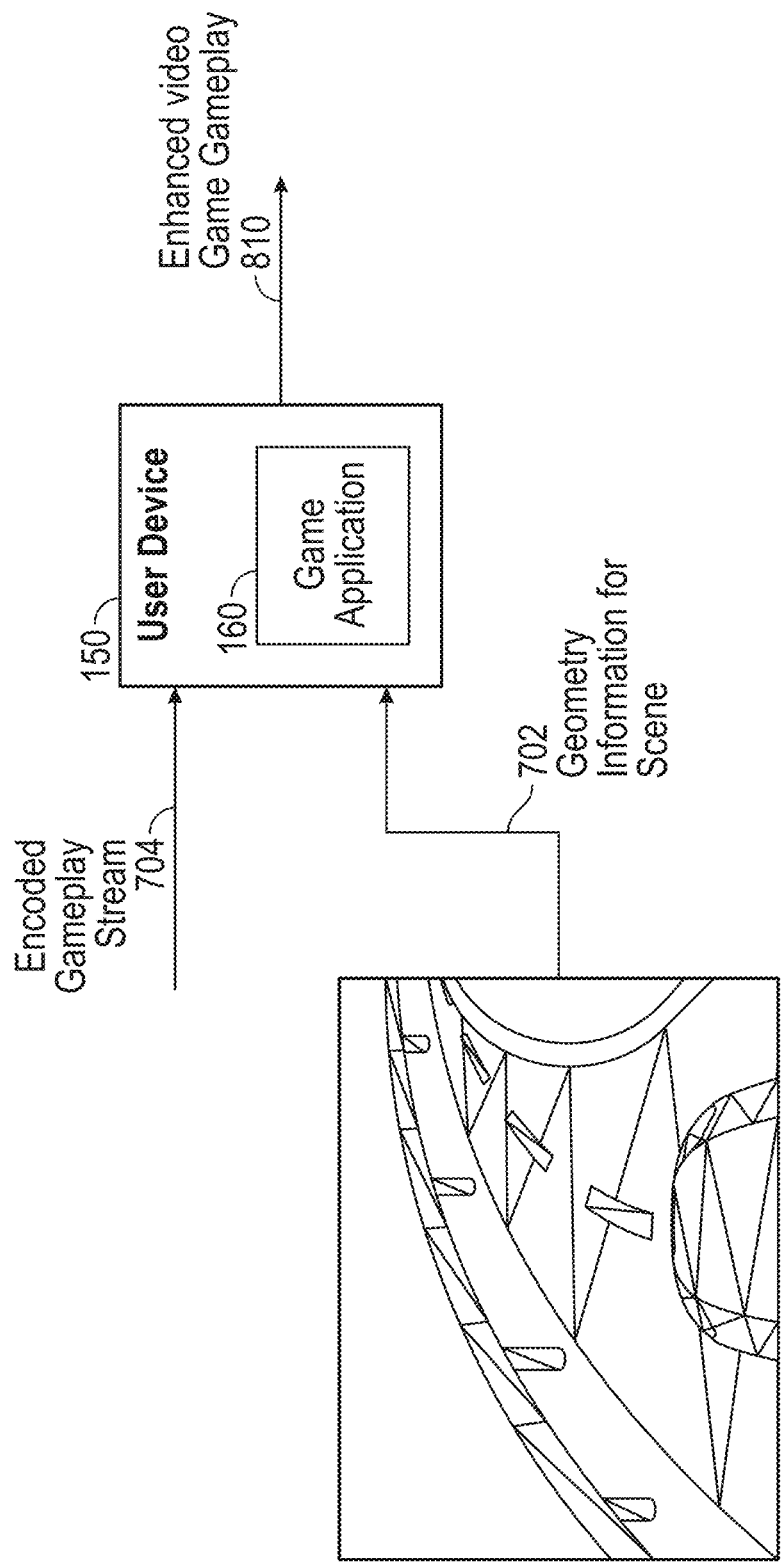
FIG. 8B illustrates a block diagram of a user device generating enhanced video game gameplay.

FIG. 8B illustrates a block diagram of a user device 150 generating enhanced video game gameplay 810. The user device 150 (e.g., the game application 160) may receive streams from the stream optimization system 100 including the encoded gameplay stream 704 and associated geometry information 702. In the example of FIG. 8B, the geometry information is specific to a camera view represented in rendered image scenes. The user device 150 can decode the gameplay stream 704 (e.g., using software or hardware decoders), and extract rendered image scenes from the decoded stream for presentation to a user. For each extracted rendered image scene, the user device can access corresponding geometry information for the scene. For example, the two streams may include identifiers that link geometry information with associated rendered image scene. Optionally, these identifiers may be included in a TCP or UDP header.

As described above, geometry information may be received as information identifying three-dimensional coordinates of the corners of each triangle included in a rendered image scene. The video game may generate the three-dimensional coordinates based on a depth buffer utilized to generate rendered image scenes. Thus, the user device 150 can access a rendered image scene along with triangle locations for the rendered image scene. The X and Y coordinates may correspond to X and Y coordinates within the rendered image scene, or the user device 150 may utilize information to transform these coordinates into an image space. Thus, the locations of triangles within the rendered image scene may be determined by the user device. However, this determination will result in the two-dimensional rendered image scene being correlated with two-dimensional locations of triangles.

To determine three-dimensional information for a rendered image scene, the user device 150 can essentially place the triangles within the rendered image scene based on their three-dimensional coordinates. As described above, a Z coordinate may be specified based on a depth buffer utilized by the video game. Since all points of a triangle may lie within a same plane, the user device 150 can determine an orientation of each triangle's plane based on the three-dimensional coordinates of the corners of the triangle. Once the orientation of each triangle is determined, the user device 150 can link the two-dimensional rendered image scene with three-dimensional triangle information. As an example, the user device 150 may iterate along each pixel of a rendered image frame, and determine a depth associated with each pixel based on its position within an oriented triangle. In this way, the user device 150 can recreate the scene geometry for a rendered image scene.

Thus, the user device 150 may perform post-processing effects to enhance the video game gameplay 810. For example, the user device 150 may improve lighting effects that are visible within a rendered image scene. Based on the scene geometry for a rendered image scene (e.g., a depth determined for each pixel), the user device 150 can perform an ambient occlusion process. This process may approximate how elements within the rendered image scene self-shadow. Optionally, the user device 150 may estimate locations of lights within a rendered image scene. For example, the user device 150 can determine a directionality associated with lighting included in a rendered image scene. With respect to ambient occlusion, the user device 150 may estimate an amount of visible sky for each point within the rendered image frame. As another example, and with respect to an indoor scene, the user device 150 may assume that the walls are an origin of an ambient light. Thus, the user device 150 may utilize the geometry information 702 to perform the ambient occlusion process. Optionally, the stream optimization system 100 may provide locations of lights in the geometry information 702, optionally along with a type of each light. In this example, the stream optimization system 100 may utilize the actual location of the lights to improve the ambient occlusion process.

In this way, the user device 150 may update the gameplay stream 704 to enhance presentation of the stream 704. With respect to ambient occlusion, the user device 150 may utilize a graphics processing unit (GPU) to perform shading and rendering of the updated lighting in each rendered image scene.

Utilization of Level Geometry

FIG. 8C illustrates another block diagram of an example of generating an encoded gameplay stream with geometry information 720. As described above, the stream optimization system 100 may provide geometry information for a level to the user device 150. The level geometry may include geometry information (e.g., locations of triangles) for an entire video game environment in which a user will be controlling a video game character. Upon receipt of a request from a user device 150 to execute a video game, the stream optimization system 100 may generate geometry information 720 for the video game environment. As described above, the game engine 110 may have access to all geometry information for a rendered image scene. Similarly, the game engine 110 may have access to the geometry of the game environment. For example, the video game can be initiated by the game engine 110, and upon selection of a game environment by the game engine 100, geometry information 720 for that game environment may be accessed. As described above, the geometry information 720 utilized may represent a reduced quality version of the geometry utilized when rendering image scenes to be presented to a user. For example, the geometry information 720 may indicate a smaller quantity of triangles and/or a less complicated arrangement of the triangles.

The stream optimization system 100 may 'pre-load' the geometry information 720 subsequent to receipt of the request from the user device 150. The pre-loading may include providing (e.g., as a package) the geometry information 720 for download by the user device 150. Optionally, the stream optimization system 100 may enable a user of the user device 150 to begin playing the game while the geometry information 720 is downloading. For example, the stream optimization system 100 may perform the post-processing effects while the geometry information 720 downloads in a background (e.g., silently) by the user device 150. Once downloaded, the stream optimization system 100 may indicate (e.g., via game application 16) that the user device 150 is to perform post-processing effects.

Optionally, the level geometry 720 may include a subset of the entire video game environment. For example, the subset may be a threshold distance surrounding a location of the video game character within the video game environment. The stream optimization system 100 may provide this subset in response to a request to execute a video game received from the user device 150. As the user's character moves about the video game environment, the stream optimization system 100 may provide an updated subset when the user's character is within a threshold game-world distance from an extremity of the subset.

As will be described below, the user device 150 may utilize the downloaded geometry information (e.g., the device 150 may maintain the information 720 in volatile or non-volatile memory) to enhance the video game gameplay. With the addition of the level geometry 720, as compared to the camera scene geometry 710 described above, the user device 150 can perform more complex post-processing. For example, the user device 150 may utilize more complex lighting schemes (e.g., global illumination schemes that utilize more geometry information). As another example, the user device 150 may generate three-dimensional positional audio. In this example, the user device 150 may perform audio ray casting using triangles indicated for the video game environment.

FIG. 8D illustrates another block diagram of a user device 150 generating enhanced video game gameplay 810. As illustrated, the user device 150 has received an encoded gameplay stream 704 (e.g., as described above). The user device 150 may decode the gameplay stream 704 and extract image frame scenes to be enhanced via the post-processing techniques described herein.

The level geometry information 720 as illustrated indicates a camera view 724 associated with a particular image frame scene being enhanced, along with the remaining geometry information 722 for the level or video game environment. To identify a portion of geometry information 724 that is specific to an image frame being enhanced, the stream optimization system 100 may provide information identifying locations of one or more of a video game camera, a size of an image scene captured by the camera, location of a character being controlled, and so on. Based on this provided information, the user device 150 can identify a portion of the geometry information that would be visible within the particular image frame. Optionally, to identify a portion of geometry information 722 the stream optimization system 100 may specify a subset of the triangles that are included in the camera view 724. For example, the stream optimization system 100 may specify coordinates associated with the camera view 724. In this example, the user device 150 can identify triangles that are located, at least partially, within the camera view 724.

The stream optimization system 100 may optionally transmit geometry information associated with elements of the video game environment that were not present when the level geometry 720 was initially provided to the user device 150. For example, the stream optimization system 100 may provide geometry information for characters (e.g., cars) that are located within the game environment. The geometry information for these other characters may be specified along with their locations within the video game environment. Thus, the user device 150 can place this newly received geometry information within the video game environment. For example, the user device 150 may translate between coordinates specified for the video game environment and coordinates of the particular image scene based on the camera view 724.

As described above, an example post-processing effect may include enhancing the lighting visible within a particular image frame. Similar to the ambient occlusion process described above, the user device 150 may expand the processing to take into account geometry information 722 outside of the camera view 724. For example, the geometry information may can indicate the curved railing 726 illustrated in FIG. 8D. This curved railing 726 may cause light to be reflected onto visible portions of the user's car.

Another example post-processing effect may include enhancing the audio stream included in the gameplay stream 704. In this example, the stream optimization system 100 may further provide locations of sound emitters within the video game environment. For example, a rival car may be approaching the user's car 728 from behind. This rival car may not be visible within the camera view 724, but the stream optimization system 100 may provide a location corresponding to a sound emitter associated with the rival car. The location may further indicate a sound vector, along with an intensity of the sound. The sound vector may describe a directionality associated with the sound, and/or may indicate a drop-off of sound intensity based on direction from the sound emitter. In this way, the user device 150 may identify a beam of sound associated with each sound emitter.

Since the user device 150 has access to the geometry information 720 for the level, the user device 150 can determine how the emitted sound would affect the user's sound in three-dimensions. As an example, the user device 150 may utilize a location of the car 728 as a sound receiver or may receive a specific location of a sound receiver from the stream optimization system 100. Optionally, the user device 150 may determine how sound enters and exits the camera view 724, and the sound may correspond to an energy spectrum of the sound within the entire camera view 724. The user device 150 can then perform a ray casting process to bounce the emitted sound off the geometry information 720. Thus, if the rival car is approaching the user's car 728, the user device 150 can determine how sound emitted from the rival car affects bounces off geometry information included outside the camera view 724 and then bounces at the user's car 728.

Example Process Flows

Figure 9:
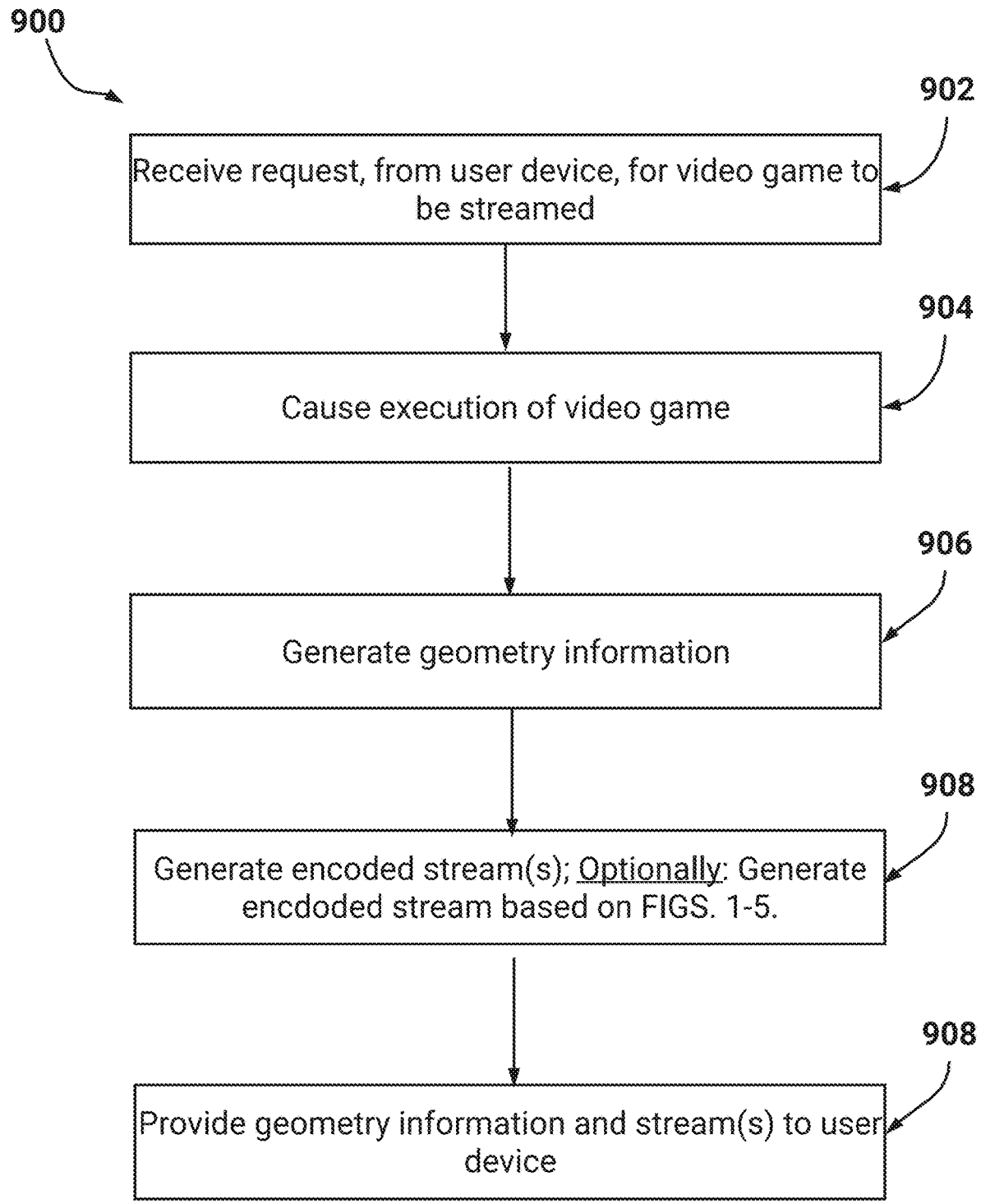
FIG. 9 illustrates a flowchart of an example process for providing an encoded gameplay stream and geometry information for the stream to a user device.

FIG. 9 illustrates a flowchart of an example process for providing an encoded gameplay stream and geometry information for the stream to a user device. For convenience, the process 900 will be described as being performed by a system of one or more computers (e.g., the stream optimization system 100).

At block 902, the system receives a request from a user device for a video game to be executed and played remotely. At block 904, the system causes execution of the video game (e.g., as described above, with respect to at least FIGS. 3-5). The system can obtain information from the user device indicating its processing power. For example, the user device can provide identifiers associated with a CPU or GPU available to the user device. As another example, the user device can execute a game application (e.g., game application 160). This game application may include a small mathematical or processing task. Based on results from this task the user device 150 can determine a processing capacity available to it. The system can receive information from the user device 150 indicating whether it is to receive geometry information. If not, the system can perform the post processing effects described above. Optionally, for particular types of user devices (e.g., mobile devices), the system may limit an extent to which the system performs post-processing effects. That is, these effects may not be visible to the user on a low resolution or small-screen display, and therefore the system may avoid performing them. Additionally, the bandwidth available to these user devices may be limited, so that compression of the gameplay stream may be high. Thus, certain post processing effects may not be evident.

At block 906, the system generates geometry information associated with the video game. As described in FIGS. 8A-8D, the system can generate level geometry and provide this level geometry to the user device. Additionally, the system can generate geometry information for individual rendered image frames, and when providing a gameplay stream can provide the corresponding geometry information.

At block 908, the system generates an encoded gameplay stream. The encoded gameplay stream may be optionally generated according to the techniques described herein with respect to FIGS. 1-5. Optionally, the encoded gameplay stream may not be adjusted based on user interface element or gameplay element as described above.

At block 910 the system provides the geometry information and gameplay stream to the user device. As described in FIGS. 8B and 8D, the user device may receive the gameplay stream and associated geometry information and perform prost processing to enhance the stream.

Figure 10:
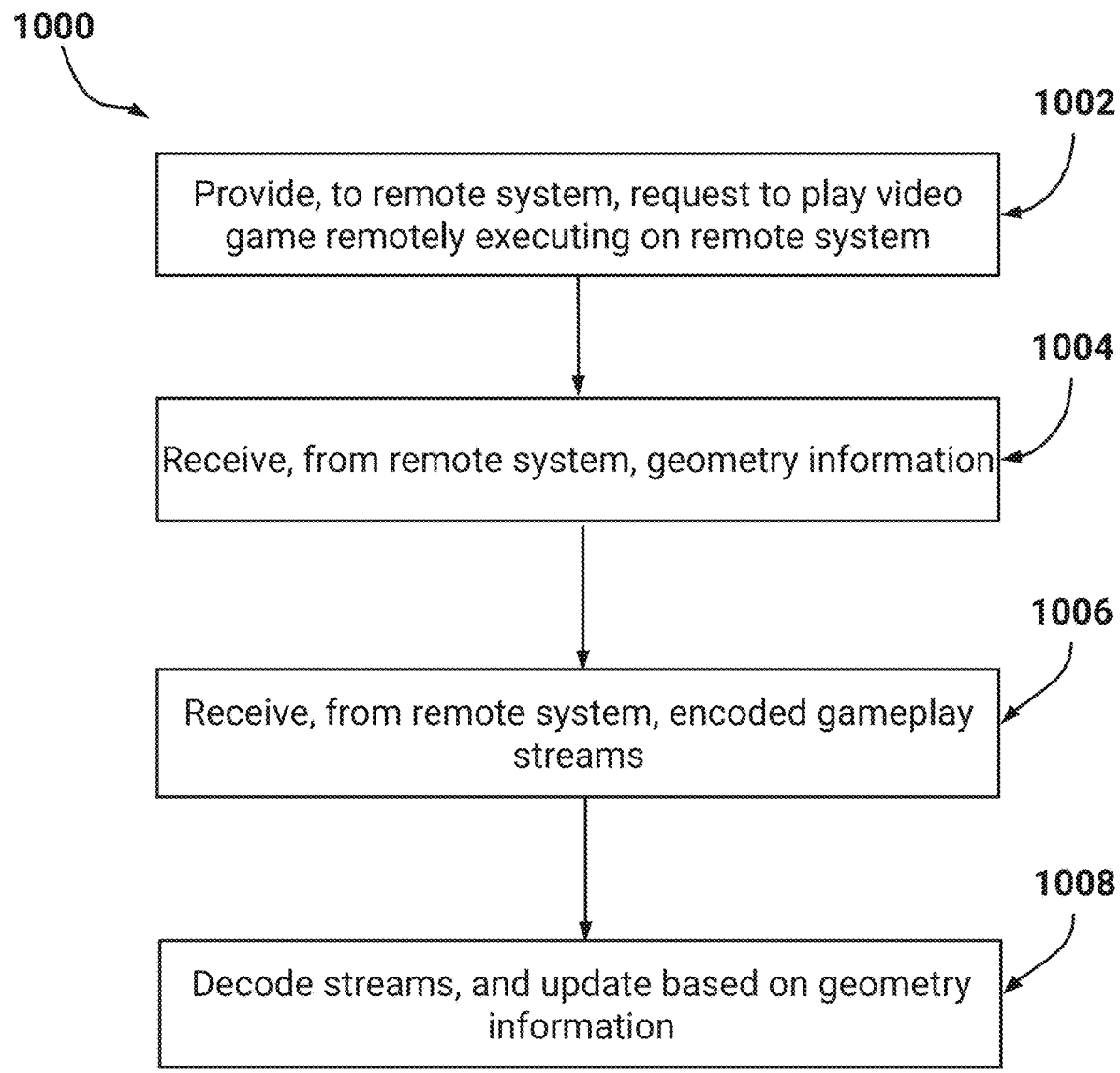
FIG. 10 illustrates a flowchart of an example process for enhancing streamed electronic gameplay on a user device.

FIG. 10 illustrates a flowchart of an example process 1000 for enhancing streamed electronic gameplay on a user device. For convenience, the process 1000 will be described as being performed on a user device of one or more processors (e.g., the user device 150).

At block 1002 the user device provides a request to a remote system to remotely play a video game executing on the remote system. At block 1004, the user device receives geometry information, and at black 1006 the user device receives an encoded gameplay stream. For example, the geometry information may be level geometry or geometry information each rendered image frame included in a gameplay stream. The user device may subscribe to both of these streams. If the user device has a reduction in processing power (e.g., due to background processes performed by an operating system of the user device consuming processing power), the user device can stop subscribing to the geometry information. The system may then optionally perform the post processing effects, such that the gameplay stream includes post processed rendered image frames. Similarly, if bandwidth available to the user device drops below a threshold (e.g., a mobile device switches from a WiFi network to a cell phone network, such as LTE), then the system may stop providing geometry information. The system may then optionally perform the post processing effects.

At block 1008, the system decodes the gameplay stream and enhances included rendered image frames based on the geometry information. As described in FIGS. 8B and 8D, the user device can enhance lighting, audio, perform anti-aliasing, and so on.

Example Hardware Configuration of Computing System

Figure 11:
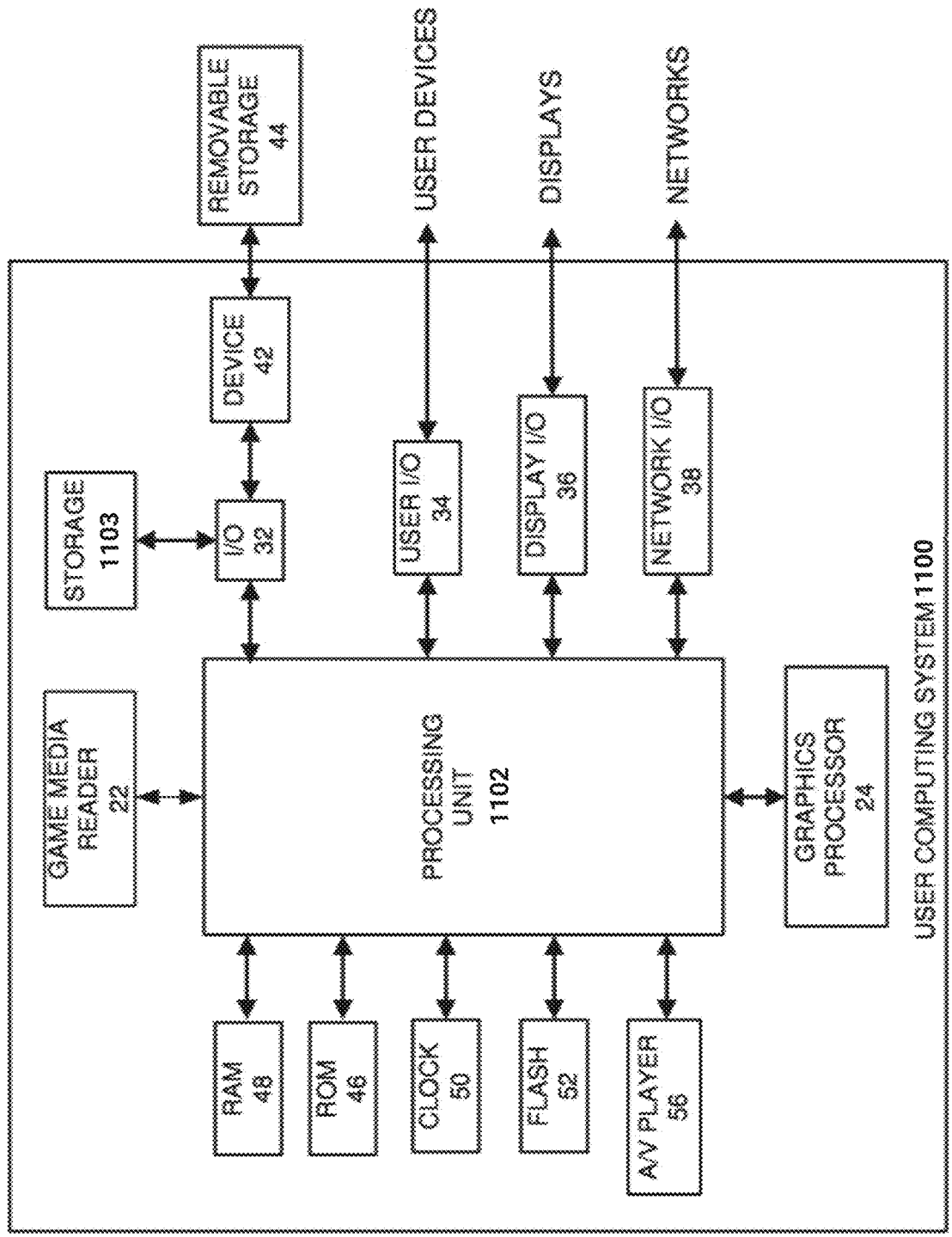
FIG. 11 illustrates an embodiment of a hardware configuration for a computing system.

FIG. 11 illustrates an embodiment of a hardware configuration for a computing system 1100 (e.g., the gameplay learning system 100 of FIG. 1). Other variations of the computing system 1100 may be substituted for the examples explicitly presented herein, such as removing or adding components to the computing system 1100. The computing system 1100 may include a computer, a server, a smart phone, a tablet, a personal computer, a desktop, a laptop, a smart television, and the like.

As shown, the computing system 1100 includes a processing unit 1102 that interacts with other components of the computing system 1100 and also components external to the computing system 1100. A game media reader 22 may be included that can communicate with game media. Game media reader 22 may be an optical disc reader capable of reading optical discs, such as CD-ROM or DVDs, or any other type of reader that can receive and read data from game media. In some embodiments, the game media reader 22 may be optional or omitted. For example, game content or applications may be accessed over a network via the network I/O 38 rendering the game media reader 22 and/or the game media optional.

The computing system 1100 may include a separate graphics processor 24. In some cases, the graphics processor 24 may be built into the processing unit 1102, such as with an APU. In some such cases, the graphics processor 24 may share Random Access Memory (RAM) with the processing unit 1102. Alternatively, or in addition, the computing system 1100 may include a discrete graphics processor 24 that is separate from the processing unit 1102. In some such cases, the graphics processor 24 may have separate RAM from the processing unit 1102. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 1100 also includes various components for enabling input/output, such as an I/O 32, a user interface I/O 34, a display I/O 36, and a network I/O 38. As previously described, the input/output components may, in some cases, including touch-enabled devices. The I/O 32 interacts with storage element 303 and, through a device 42, removable storage media 44 in order to provide storage for the computing system 1100. The storage element 303 can store a database that includes the failure signatures, clusters, families, and groups of families. Processing unit 1102 can communicate through I/O 32 to store data, such as game state data and any shared data files. In addition to storage 1103 and removable storage media 44, the computing system 1100 is also shown including ROM (Read-Only Memory) 46 and RAM 48. RAM 48 may be used for data that is accessed frequently, such as when a game is being played, or for all data that is accessed by the processing unit 1102 and/or the graphics processor 24.

User I/O 34 is used to send and receive commands between processing unit 1102 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 1100 on a display device, such as graphics, user interfaces, video, and/or other visual content. The computing system 1100 may comprise one or more integrated displays configured to receive display output signals produced by the display I/O 36, which may be output for display to a user. According to some embodiments, display output signals produced by the display I/O 36 may also be output to one or more display devices external to the computing system 1100.

The computing system 1100 can also include other features that may be used with a game, such as a clock 50, flash memory 52, and other components. An audio/video player 56 might also be used to play a video sequence, such as a movie. It should be understood that other components may be provided in the computing system 1100 and that a person skilled in the art will appreciate other variations of the computing system 1100.

Program code can be stored in ROM 46, RAM 48, or storage 1103 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 1103, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 1100 is turned off or loses power.

As computing system 1100 reads game media 12 and provides a game, information may be read from game media 12 and stored in a memory device, such as RAM 48. Additionally, data from storage 1103, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 1102 or distributed among several media, such as game media 12 and storage 1103.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The following list has example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure:

1. A computer-implemented method for increasing visual fidelity of streamed information, the method comprising:
under control of one or more hardware computing devices configured with specific computer-executable instructions, the specific computer-executable instructions stored in an electronic hardware memory,
receiving, from a remote user device over a network, a request to play a video game on the remote user device;
executing the video game, wherein the video game is executed by the one or more hardware computing devices and provided to the user device for display;
receiving, from the user device, user input configured to control operation of one or more virtual entities within the video game;
generating rendered image frames during execution of the video game based at least in part on the user input received from the user device;
encoding the rendered image frames into a gameplay stream, wherein first elements included in each rendered image frame are encoded at a first quality and wherein second elements included in the rendered image frame are encoded at a second quality; and
providing, to the user device over the network, the encoded gameplay stream for presentation, wherein the encoded gameplay stream is configured to be output as a series of rendered image frames on the user device.

2. The method of embodiment 1, wherein generating a particular rendered image frame comprises:
monitoring, by the system, elements to be included in the particular rendered image frame, wherein the elements comprise user interface elements and gameplay elements;
generating, based on the monitored elements, a first image frame that comprises rendered user interface elements; and
generating, based on the monitored elements, a second image frame that comprises rendered gameplay elements, wherein the first image frame and second image frame are combinable to represent the particular rendered image frame.

3. The method of embodiment 2, wherein monitoring elements comprises identifying, by the system, draw calls issued by the video game to render each element, the draw calls identifying a type of element being rendered, and wherein the type of element comprises user interface elements or gameplay elements.

4. The method of embodiment 1, wherein for a particular rendered image frame the first elements comprise gameplay elements and wherein the second elements comprise user interface elements overlaid on the gameplay elements,
wherein the first quality at which the gameplay elements are encoded is adjusted based on a detected bandwidth available to the user device to reduce a size associated with the gameplay stream,
and wherein the second quality at which the user interface elements are encoded is maintained in the gameplay stream.

5. The method of embodiment 1, wherein reducing a quality of an element comprises adjusting a bitrate associated with the encoding of the element or adjusting a resolution associated with the element.

6. The method of embodiment 1, wherein for a particular rendered image frame being encoded, the first elements comprise gameplay elements extracted from the particular rendered image frame, and the second elements comprise user interface elements extracted from the particular rendered image frame, and wherein encoding the particular rendered image frame comprises:
   accessing first mask information, the first mask information identifying a compression or reduction in quality to be applied to be respective pixels corresponding to gameplay elements; and
   encoding the particular rendered image frame based, at least in part, on the first mask information.

7. The method of embodiment 6, wherein the gameplay elements are included in a first image frame, and wherein the user interface elements are included in a second image frame, and wherein the first mask information is included in a third image frame, and wherein generating the first mask information comprises:
   assigning, based on each pixel in the second image frame, a color of a pixel in the third image frame at a same location as the pixel, the color indicating a measure associated with a transparency of the pixel in the second image frame.

8. The method of embodiment 7, wherein the colors are selected from grayscale colors, and wherein pixels corresponding to transparent user interfaces are assigned to a first extremity of the grayscale colors, and wherein pixels corresponding to opaque user interfaces are assigned to a second, opposite, extremity of the grayscale colors.

9. The method of embodiment 7, wherein encoding the particular rendered image frame based on the first mask information comprises:
   identifying, for each pixel of the first image frame, a color of a pixel in the third image frame at a same location; and
   adjusting a quality associated with the pixels included in the first image frame based on their corresponding colors in the third image frame.

10. The method of embodiment 1, wherein the encoded gameplay stream comprises a first stream with gameplay elements and a second stream with user interface elements, and wherein the user device is configured to extract the gameplay elements and user interface elements, and overlay the user interface elements on the gameplay elements.

11. The method of embodiment 1, wherein user interface elements are included in the gameplay stream based on a determination that the user interface elements have changed since a previous inclusion in the gameplay stream.

12. The method of embodiment 1, wherein user interface elements are included in the gameplay stream at a first frequency, and wherein gameplay elements are included in the stream at a second frequency, the second frequency corresponding to a refresh rate of the video game, and the first frequency being less than the second frequency.

13. Non-transitory computer storage media storing instructions that when executed by a system of one or more computers, cause the one or more computers to perform operations comprising:
   receiving, from a remote user device over a network, a request to play a video game on the remote user device;
   executing the video game, wherein the video game is executed by the system and provided to the user device for display;
   receiving, from the user device, user input configured to control operation of one or more virtual entities within the video game;
   generating rendered image frames during execution of the video game based at least in part on the user input received from the user device;
   encoding the rendered image frames into a gameplay stream, wherein first elements included in each rendered image frame are encoded at a first quality and wherein second elements included in the rendered image frame are encoded at a second quality; and
   providing, to the user device over the network, the encoded gameplay stream for presentation, wherein the encoded gameplay stream is configured to be output as a series of rendered image frames on the user device.

14. The computer storage media of embodiment 13, wherein generating a particular rendered image frame comprises:
   monitoring, by the system, elements to be included in the particular rendered image frame, wherein the elements comprise user interface elements and gameplay elements;
   generating, based on the monitored elements, a first image frame that comprises rendered user interface elements; and
   generating, based on the monitored elements, a second image frame that comprises rendered gameplay elements, wherein the first image frame and second image frame are combinable to represent the particular rendered image frame.

15. The computer storage media of embodiment 13, wherein for a particular rendered image frame the first elements comprise gameplay elements and wherein the second elements comprise user interface elements overlaid on the gameplay elements,
   wherein the first quality at which the gameplay elements are encoded is adjusted based on a detected bandwidth available to the user device to reduce a size associated with the gameplay stream,
   and wherein the second quality at which the user interface elements are encoded is maintained in the gameplay stream.

16. The computer storage media of embodiment 13, wherein for a particular rendered image frame being encoded, the first elements comprise gameplay elements extracted from the particular rendered image frame, and the second elements comprise user interface elements extracted from the particular rendered image frame, and wherein encoding the particular rendered image frame comprises:
   accessing first mask information, the first mask information identifying a compression or reduction in quality to be applied to be respective pixels corresponding to gameplay elements; and
   encoding the particular rendered image frame based, at least in part, on the first mask information.

17. The computer storage media of embodiment 13, wherein the encoded gameplay stream comprises a first stream with gameplay elements and a second stream with user interface elements, and wherein the user device is configured to extract the gameplay elements and user interface elements, and overlay the user interface elements on the gameplay elements.

18. A system comprising one or more computers and computer storage media storing instructions that when executed by the one or more computers, cause the one or more computers to perform operations comprising:
  receiving, from a remote user device over a network, a request to play a video game on the remote user device;
  executing the video game, wherein the video game is executed by the system and provided to the user device for display;
  receiving, from the user device, user input configured to control operation of one or more virtual entities within the video game;
  generating rendered image frames during execution of the video game based at least in part on the user input received from the user device;
  encoding the rendered image frames into a gameplay stream, wherein first elements included in each rendered image frame are encoded at a first quality and wherein second elements included in the rendered image frame are encoded at a second quality; and
  providing, to the user device over the network, the encoded gameplay stream for presentation, wherein the encoded gameplay stream is configured to be output as a series of rendered image frames on the user device.

19. The system of embodiment 18, wherein generating a particular rendered image frame comprises:
  monitoring, by the system, elements to be included in the particular rendered image frame, wherein the elements comprise user interface elements and gameplay elements;
  generating, based on the monitored elements, a first image frame that comprises rendered user interface elements; and
  generating, based on the monitored elements, a second image frame that comprises rendered gameplay elements, wherein the first image frame and second image frame are combinable to represent the particular rendered image frame.

20. The system of embodiment 18, wherein the encoded gameplay stream comprises a first stream with gameplay elements and a second stream with user interface elements, and wherein the user device is configured to extract the gameplay elements and user interface elements, and overlay the user interface elements on the gameplay elements.

21. A computer-implemented method comprising:
  under control of one or more hardware computing devices configured with specific computer-executable instructions, the specific computer-executable instructions stored in an electronic hardware memory,
    receiving, from a user device, a request to remotely play a video game, the video game being executed by the system and streamed to the user device for presentation;
    executing the video game, and generating rendered image frames via execution of the video game;
    generating geometry data associated with the rendered image frames, the geometry data representing locations of geometric elements that form geometry utilized, by the video game, to generate the rendered image frames;
    encoding the rendered image frames into a gameplay stream; and
    providing, to the user device, a first stream comprising the encoded gameplay stream and a second stream comprising the geometry data,
    wherein the user device is configured to perform, based at least in part on the geometry data, post-processing effects on the rendered image frames encoded in the gameplay stream prior to display on the user device.

22. The method of embodiment 21, wherein post-processing effects comprise ambient occlusion, anti-aliasing, and/or generating three-dimensional audio.

23. The method of embodiment 21, wherein the method further comprises:
  detecting a processing power associated with the user device; and
  in response to the processing power exceeding a threshold, providing the second stream comprising the geometry data.

24. The method of embodiment 21, wherein the geometry data indicates three-dimensional coordinates of corners of each geometric element, and wherein the three-dimensional coordinates are determined, at least in part, using a depth buffer maintained by the video game.

25. The method of embodiment 21, wherein the geometry data comprises geometry data for a video game environment to be played, and wherein the geometry data is provided in response to receiving the request, such that the geometry data is pre-loaded onto the user device.

26. The method of embodiment 25, further comprising:
  for each encoded rendered image frame, generating information identifying one or more of a location of a video game camera that captured the rendered image frame, a location of characters included in the rendered image frame, or information identifying triangles that form geometry utilized to generate the rendered image frame,
  wherein the user device is configured to utilize the generated information to identify a portion of the geometry data for the video game environment that corresponds to the rendered image frame.

27. The method of embodiment 25, further comprising:
  for a particular encoded rendered image frame, providing geometry information associated with video game characters included in the particular encoded rendered image frame, the characters not being included in the geometry data for the video game environment.

28. The method of embodiment 21, wherein the system generates respective geometry data for each rendered image frame, such that geometry data for elements included in each rendered image frame may be utilized by the user device to perform post-processing.

29. The method of embodiment 21, further comprising:
  receiving, via the user device, the first stream comprising the gameplay stream the second stream comprising geometry data;
  extracting, from the gameplay stream, a first rendered image frame for presentation; and
  based on geometry data associated with the first rendered image, performing a post-processing effect to enhance a lighting of the first rendered image, wherein the post-processing effect utilizes the geometry data to determine an accessibility of each pixel in the first rendered image to light.

30. Non-transitory computer storage media storing instructions that when executed by a system of one or more computers, cause the one or more computers to perform operations comprising:
  receiving, from a user device, a request to remotely play a video game, the video game being executed by the system and streamed to the user device for presentation;
  executing the video game, and generating rendered image frames via execution of the video game;
  generating geometry data associated with the rendered image frames, the geometry data representing locations of geometric elements that form geometry utilized, by the video game, to generate the rendered image frames;

encoding the rendered image frames into a gameplay stream; and providing, to the user device, a first stream comprising the encoded gameplay stream and a second stream comprising the geometry data, wherein the user device is configured to perform, based at least in part on the geometry data, post-processing effects on the rendered image frames encoded in the gameplay stream prior to display on the user device.

31. The computer storage media of embodiment 30, wherein post-processing effects comprise ambient occlusion, anti-aliasing, and/or generating three-dimensional audio.

32. The computer storage media of embodiment 30, wherein the operations further comprise:

detecting a processing power associated with the user device; and in response to the processing power exceeding a threshold, providing the second stream comprising the geometry data.

33. The computer storage media of embodiment 30, wherein the geometry data indicates three-dimensional coordinates of corners of each geometric element, and wherein the three-dimensional coordinates are determined, at least in part, using a depth buffer maintained by the video game.

34. The computer storage media of embodiment 30, wherein the geometry data comprises geometry data for a video game environment to be played, and wherein the geometry data is provided in response to receiving the request, such that the geometry data is pre-loaded onto the user device.

35. The computer storage media of embodiment 34, wherein the operations further comprise:

for each encoded rendered image frame, generating information identifying one or more of a location of a video game camera that captured the rendered image frame, a location of characters included in the rendered image frame, or information identifying triangles that form geometry utilized to generate the rendered image frame, wherein the user device is configured to utilize the generated information to identify a portion of the geometry data for the video game environment that corresponds to the rendered image frame.

36. The computer storage media of embodiment 30, wherein the system generates respective geometry data for each rendered image frame, such that geometry data for elements included in each rendered image frame may be utilized by the user device to perform post-processing.

37. A system comprising one or more computers and computer storage media storing instructions that when executed by the one or more computers, cause the one or more computers to perform operations comprising:

receiving, from a user device, a request to remotely play a video game, the video game being executed by the system and streamed to the user device for presentation;

executing the video game, and generating rendered image frames via execution of the video game;

generating geometry data associated with the rendered image frames, the geometry data representing locations of geometric elements that form geometry utilized, by the video game, to generate the rendered image frames;

encoding the rendered image frames into a gameplay stream; and providing, to the user device, a first stream comprising the encoded gameplay stream and a second stream comprising the geometry data, wherein the user device is configured to perform, based at least in part on the geometry data, post-processing effects on the rendered image frames encoded in the gameplay stream prior to display on the user device.

38. The system of embodiment 37, wherein post-processing effects comprise ambient occlusion, anti-aliasing, and/or generating three-dimensional audio.

39. The system of embodiment 37, wherein the geometry data comprises geometry data for a video game environment to be played, and wherein the geometry data is provided in response to receiving the request, such that the geometry data is pre-loaded onto the user device.

40. The system of embodiment 37, wherein the system generates respective geometry data for each rendered image frame, such that geometry data for elements included in each rendered image frame may be utilized by the user device to perform post-processing.

It should be emphasized that many variations and modifications may be made to the above-described embodiments, the elements of which are to be understood as being among other acceptable examples. All such modifications and variations are intended to be included herein within the scope of this disclosure.

The invention claimed is:

1. A computer-implemented method comprising:
under control of one or more hardware computing devices configured with specific computer-executable instructions, the specific computer-executable instructions stored in an electronic hardware memory, receiving, from a user device, a request associated with execution of a video game by the one or more hardware computing devices;

generating geometry data associated with rendered image frames, the geometry data representing locations of geometric elements which form geometry utilized, by the video game, to generate the rendered image frames; and providing, to the user device, a first stream comprising an encoded gameplay stream comprising the rendered image frames and a second stream comprising the geometry data, wherein the second stream is configured to be used for post-processing of the rendered image frames.

2. The method of claim 1, wherein post-processing of the rendered image frames comprises applying post-professing effects comprising one or more of ambient occlusion, anti-aliasing, or generating three-dimensional audio.

3. The method of claim 1, wherein post-processing of the rendered image frame comprises performing global illumination.

4. The method of claim 1, wherein the request associated with execution of the video game comprises a request to remotely play the video game via the user device.

5. The method of claim 1, wherein the second stream is provided to the user device based on a processing power associated with the user device exceeding a threshold.

6. The method of claim 1, wherein the second stream is provided to the user device based on a bandwidth associated with the user device exceeding a threshold.

7. The method of claim 1, wherein the geometry data indicates three-dimensional coordinates of corners of each geometric element, and wherein the three-dimensional coordinates are determined, at least in part, using a depth buffer maintained by the video game.

8. The method of claim 1, wherein particular geometry data associated with the video game is pre-loaded on the user device.

9. The method of claim 1, wherein the geometry data is simplified via combining geometric elements to form larger geometric elements, and wherein the post-processing is performed based on the larger geometric elements.

10. The method of claim 1, wherein the geometry data encompasses geometric elements within a camera view.

11. The method of claim 10, wherein the geometry data further encompasses particular geometric elements which are outside of the camera view.

12. Non-transitory computer storage media storing instructions that when executed by a system of one or more computers, cause the one or more computers to perform operations comprising:
   receiving, from a user device, a request associated with execution of a video game by the one or more hardware computing devices;
   generating geometry data associated with rendered image frames, the geometry data representing locations of geometric elements which form geometry utilized, by the video game, to generate the rendered image frames; and
   providing, to the user device, a first stream comprising an encoded gameplay stream comprising the rendered image frames and a second stream comprising the geometry data, wherein the second stream is configured to be used for post-processing of the rendered image frames.

13. The computer storage media of claim 12, wherein post-processing of the rendered image frames comprises applying post-professing effects comprising one or more of ambient occlusion, anti-aliasing, or generating three-dimensional audio.

14. The computer storage media of claim 12, wherein the second stream is provided to the user device based on a processing power associated with the user device exceeding a threshold.

15. The computer storage media of claim 12, wherein the second stream is provided to the user device based on a bandwidth associated with the user device exceeding a threshold.

16. The computer storage media of claim 12, wherein the geometry data indicates three-dimensional coordinates of corners of each geometric element, and wherein the three-dimensional coordinates are determined, at least in part, using a depth buffer maintained by the video game.

17. The computer storage media of claim 12, wherein the geometry data is simplified via combining geometric elements to form larger geometric elements, and wherein the post-processing is performed based on the larger geometric elements.

18. A system comprising one or more computers and computer storage media storing instructions that when executed by the one or more computers, cause the one or more computers to perform operations comprising:
   receiving, from a user device, a request associated with execution of a video game by the one or more hardware computing devices;
   generating geometry data associated with rendered image frames, the geometry data representing locations of geometric elements which form geometry utilized, by the video game, to generate the rendered image frames; and
   providing, to the user device, a first stream comprising an encoded gameplay stream comprising the rendered image frames and a second stream comprising the geometry data, wherein the second stream is configured to be used for post-processing of the rendered image frames.

19. The system of claim 18, wherein post-processing of the rendered image frames comprises applying post-professing effects comprising one or more of ambient occlusion, anti-aliasing, or generating three-dimensional audio.

20. The system of claim 18, wherein the geometry data is simplified via combining geometric elements to form larger geometric elements, and wherein the post-processing is performed based on the larger geometric elements.

* * * * *